US011887368B2

United States Patent
Forouhar et al.

(10) Patent No.: US 11,887,368 B2
(45) Date of Patent: Jan. 30, 2024

(54) METHODS, SYSTEMS AND SOFTWARE PROGRAMS FOR ENHANCED SPORTS ANALYTICS AND APPLICATIONS

(71) Applicant: MOCAP ANALYTICS, INC., Palo Alto, CA (US)

(72) Inventors: Arian S. Forouhar, Menlo Park, CA (US); Mathew M. Kellogg, Palo Alto, CA (US); Kavodel Ohiomoba, Palo Alto, CA (US); Eldar Akhmetgaliyev, Mountain View, CA (US)

(73) Assignee: Sportrader US LLC, Minneapolis, MN (US)

( * ) Notice: Subject to any disclaimer, the term of this patent is extended or adjusted under 35 U.S.C. 154(b) by 636 days.

(21) Appl. No.: 15/728,649

(22) Filed: Oct. 10, 2017

(65) Prior Publication Data

US 2018/0137364 A1   May 17, 2018

Related U.S. Application Data

(63) Continuation of application No. 14/398,942, filed as application No. PCT/US2013/039569 on May 3, 2013, now abandoned.

(Continued)

(51) Int. Cl.
*G06V 20/40* (2022.01)
*G06V 40/20* (2022.01)
(Continued)

(52) U.S. Cl.
CPC .............. *G06V 20/42* (2022.01); *G06F 16/71* (2019.01); *G06F 16/7837* (2019.01);
(Continued)

(58) Field of Classification Search
CPC ......... H04W 4/80; H04W 4/029; H04W 4/02; G06F 16/9535; G06F 16/7837;
(Continued)

(56) References Cited

U.S. PATENT DOCUMENTS 8,229,824 B2 * 7/2012 Berg ...................... G06Q 40/04
705/36 R
8,289,185 B2 * 10/2012 Alonso ..................... H04Q 9/00
340/870.11

(Continued)

OTHER PUBLICATIONS

Abbott et al., Land-Vehicle Navigation Using GPS, Jan. 1999 [retrieved Aug. 9, 2019], Proceedings of the IEEE, vol. 87, Issue 1, pp. 145-162. Retrieved: https://ieeexplore.ieee.org/abstract/document/736347 (Year: 1999).*

(Continued)

*Primary Examiner* — Matthew C Bella
*Assistant Examiner* — Dennis Rosario
(74) *Attorney, Agent, or Firm* — Stinson LLP

(57) ABSTRACT

A system for enhanced sports analytics and/or content creation includes: an object tracking system that generates coordinate data corresponding to object motion in a sports event; a data processing module that receives the coordinate data from the object tracking system, analyzes the coordinate data with an event recognition algorithm that identifies and characterizes events and outcomes of interest, and catalogs the data in accordance with the identified events and outcomes into event profile data; a database that receives and stores the event profile data generated by the data processing module; a user application that accesses the event profile data from the database; and at least one processing unit that executes instructions stored in at least one non-transitory medium to implement at least one of the object tracking system, the data processing module, or the user application.

21 Claims, 30 Drawing Sheets
(20 of 30 Drawing Sheet(s) Filed in Color)

Related U.S. Application Data

(60) Provisional application No. 61/642,454, filed on May 4, 2012, provisional application No. 61/790,641, filed on Mar. 15, 2013.

(51) Int. Cl.
*G06F 16/71* (2019.01)
*G06F 16/783* (2019.01)

(52) U.S. Cl.
CPC .... *G06V 20/44* (2022.01); *G06T 2207/30221* (2013.01); *G06V 40/23* (2022.01)

(58) Field of Classification Search
CPC ........... G06K 9/00342; G06K 9/00624; G06K 9/00724; G06K 9/00744; G06K 9/00718; G06K 9/00751; G06K 9/00711; G06K 2009/00738; H04N 21/4532; H04N 21/23418; H04N 21/44008; H04N 5/265; H04N 7/181; H04N 23/90; H04N 13/156; H04N 23/61; H04N 23/611; H04N 19/31; H04N 19/33; A63B 2225/50; A63B 2220/12; A63B 2220/836; A63B 24/0021; A63B 24/0062; A63B 2024/0025; A63B 2220/806; A63B 2024/0028; A63B 2220/13; A63B 24/0003; A63B 2024/0056; G06T 2200/04; G06T 7/20; G06T 2207/30221; G06T 2207/30224; G06T 19/006; G06T 11/60; G06T 2207/20221; G06T 2207/30228; G06V 20/52; G06V 40/103; G06V 40/20; G06V 20/20; G06V 20/46; G06V 20/50; G06V 20/53; G06V 20/58; G06V 20/588; G06V 10/62; G06V 20/42; G06V 20/40; G06V 10/245; G06V 40/23; G06V 10/255; G06V 10/70; G06V 10/768; G06V 10/778; G06V 10/80; G06V 10/806; G06V 10/88; G06V 20/44

See application file for complete search history.

(56) References Cited

U.S. PATENT DOCUMENTS

| | | | | |
|---|---|---|---|---|
| 8,527,333 | B1* | 9/2013 | Chatterjee | G06Q 30/0241 705/14.1 |
| 8,655,030 | B2* | 2/2014 | Li | G06K 9/00724 382/118 |
| 8,660,369 | B2* | 2/2014 | Llano | G06F 16/58 382/224 |
| 9,087,332 | B2* | 7/2015 | Bagherjeiran | G06Q 30/00 |
| 9,298,986 | B2* | 3/2016 | Ferlatte | G06K 9/00724 |
| 2003/0008719 | A1* | 1/2003 | Wilk | A63B 69/3691 473/169 |
| 2008/0108456 | A1* | 5/2008 | Bonito | A63B 24/0084 473/409 |
| 2013/0097285 | A1* | 4/2013 | van Zwol | G06Q 30/0269 709/219 |
| 2013/0222418 | A1* | 8/2013 | Campbell | G06F 3/14 345/629 |
| 2013/0305287 | A1* | 11/2013 | Wong | H04N 21/482 725/42 |

OTHER PUBLICATIONS

Mutschler, Online Data-Mining of Interactive Trajectories in Realtime Location Systems (Thesis), Apr. 8, 2020 [retrieved Apr. 8, 2020], University of Erlangen-Nuremberg, 160 pages. Retrieved: http://citeseerx.ist.psu.edu/viewdoc/download?doi=10.1.1.421.9776&rep=rep1&type=pdf (Year: 2020).*

Perse et al., A trajectory-based analysis of coordinated team activity in a basketball game, On-line: Mar. 28, 2008 [retrieved Sep. 15, 2020], Comp Vis and Image Understanding, vol. 113, Isue 5, May 2009, pp. 612-621. Retrieved: https://www.sciencedirect.com/science/article/pii/S1077314208000465 (Year: 2008).*

* cited by examiner

Fig. 19 to me

MIL@WAS MAR13:WAS contested 39% of MIL's outside shots in the halfcourt, and MIL scored 0.44 PPP on those contested looks #CouldYOUtell? ; MIL@WAS MAR13:WAS's halfcourt interior touch usage rate was 34% #StuckOutside #MOCAPUsageRate #CountingOnJumpers #BELOWavg ; MIL@WAS MAR13:Ekpe Udoh got out on the break and got back on D quicker than anybody else; MIL@WAS MAR13: WAS was pushing the pace tonight #RunningTheFloor #OnTheBreak ; MIL@WAS MAR13:MIL's game plan was to go over the screens tonight; MIL@WAS MAR13:MIL's halfcourt ball screen usage rate was 60% #justAVERAGE #NotTheMOtonight #MOCAPUsageRate ; MIL@WAS MAR13:Last night, J.J. Redick's halfcourt first step broke the radar gun a few times #Explosive #Doin55ina54 #whoosh! ; MIL@WAS MAR13:MIL's halfcourt cutter usage rate was 9% #justAVERAGE #MOCAPUsageRate #NotTheMOtonight ; MIL@WAS MAR13:WAS created 7.3 ft of air space per catch in their halfcourt offense #AirSpace #GameWithinTheGame ; MIL@WAS MAR13:Martell Webster is the MOCAP SpeedSTAR of the Night#EndtoEnd #Suicides #InShape ; MIL@WAS MAR13:Last night, John Wall's halfcourt first step broke the radar gun a few times #turningthecorner #whoosh! #Doin55ina54 ; MIL@WAS MAR13:MIL's halfcourt catch off screen usage rate was 39% #Pindowns #BaselineSprints

Fig. 21

Fig. 25

Fig. 26a
Fig. 26b

METHODS, SYSTEMS AND SOFTWARE PROGRAMS FOR ENHANCED SPORTS ANALYTICS AND APPLICATIONS

FIELD

The concepts disclosed herein relate to methods, systems, application programming interfaces (APIs) and software programs for real time and non-real time enhanced sports analytics and content creation. More specifically, these concepts relate to the field of computational algorithms for pattern recognition, activity identification, outcomes analysis, and information storage and accessibility in the field of sports analytics and sports content creation. The applications of these analyses may have broad reach into several dimensions of the sports industry and, accordingly, could provide valuable tools for sports franchises, sports media providers, fantasy sports players, fans at the stadium and casual observers watching the game in their living rooms.

BACKGROUND

Object tracking during sporting activities (games, practices, or workouts) is now available through invasive and non-invasive tools. By tagging objects on the playing field, using, for example RFID tags, motion transducers or other tracking devices, or by post-processing synchronized and calibrated video recordings of activities, it may now be possible to extract multi-dimensional information about objects or players, such as, for example, the 4-dimensional (3 spatial dimensions and time) location (x,y,z,t) of objects throughout a sporting event or activity. Traditional video recording techniques do not allow quantitative position information to be automatically extracted due to insufficient viewing angles, moving camera angles and zooms, non-calibrated images, and absence of tagged objects.

Recent advances in non-invasive object tracking tools and miniature player tracking devices have spawned the need for novel quantitative data analysis tools that are customizable and equipped to provide easy to understand results and accessible information. It would be beneficial for the newly available information to be accessible for a variety of applications, including real time observation and interaction. In order to allow the analyses of both the object-tracking and other external sources of data to be rendered in 'real-time' additional consideration and systems must be built in parallel.

In sports, teams, including players, coaches, owners, general managers, and others, benefit from creating effective strategies and employing these strategies at the appropriate times and with the appropriate personnel. Teams regularly question whether a game plan was well designed, whether a game plan was properly executed by the players, and what type of ability and/or effort the players demonstrated during the event or activity. Teams benefit from making appropriate personnel decisions which may include drafting players, trading players, or re-signing current players. These decisions are best made with comprehensive and customized analytic tools that extract information from all the available data.

Until now, the available data from sporting activities has largely been qualitative. As a result, it has not been possible to precisely determine the location and occurrence of every sporting activity due to limited data and cumbersome analytic processes. Similarly, when a sporting activity of interest occurs, it has not previously been possible to automatically and precisely extract the characteristics, such as, the location, velocity, interactions or other characteristics of every object, or groups of objects, in a sporting activity. To the extent such data is available and utilized, it is usually obtained through rigorous manual techniques involving many hours of labor, accompanied by the unpredictability of human error and judgment.

With the availability of quantitative data from recently developed object tracking technology, it may be possible to improve playing performance, team strategy, broadcasting and media programming and the overall consumer experience. The utility of this data will depend on the quality and robustness of the customizable, automated algorithms developed to quantitatively, consistently, and comprehensively characterize every sporting activity as it occurs, as well as the timely accessibility of all the permutations of the results of these activities.

Using video data, one can identify the occurrence of activities in a cumbersome and labor intensive manner, but still cannot precisely and comprehensively quantify characteristics of activities such as, for example location, speed, and distance. Nor is it possible to accurately and precisely relate such characteristics to specific points in time.

The automated event identification methods described herein have made such a massive amount of new information available, and within a negligible time of actual event occurrence, that a variety of novel real-time applications for the information are now available, necessitating customized real time system architectures, methods and tools.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects and advantages of the various devices, systems and methods presented herein are described with reference to drawings of certain embodiments, which are intended to illustrate, but not to limit, such devices, systems and methods. It is to be understood that the attached drawings are for the purpose of illustrating concepts of the embodiments discussed herein and may not be to scale.

FIG. 19 is an illustration of an automated narrative distributed through a social media platform according to one embodiment of the invention.

FIG. 21 is an illustration of an automated narrative distributed through an email according to one embodiment of the invention.

FIG. 25 is an illustration of a text selection suggestion tool according to one embodiment of the invention.

FIGS. 26a and 26b is an illustration of a textual trend suggestion tool according to one embodiment of the invention.

DETAILED DESCRIPTION

Figure 1A:
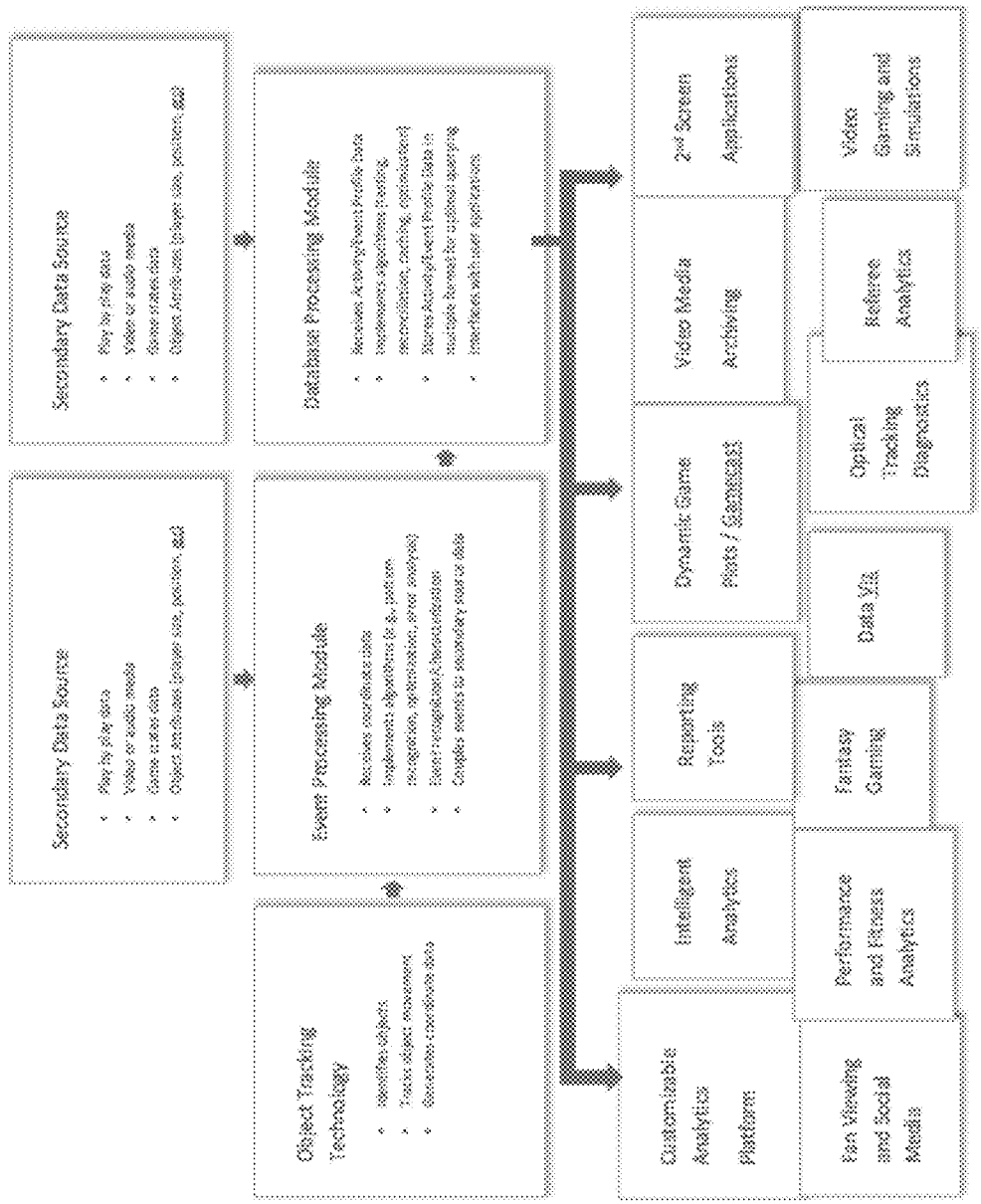
FIGS. 1a and 1b is an illustration of a conceptual architecture for an exemplary system in accordance with one embodiment of the invention and an illustration of a real-time data processing system, respectively.

The ability to interpret quantitative object locations using automated pattern recognition algorithms makes it possible to characterize and analyze player and team performances and interactions in a precise, reliable and comprehensive manner. Understanding these activities, along with the strengths, weaknesses and tendencies of one player, team or opponent will allow for improved, data-driven preparation and strategic decisions, and the availability of new information for observers.

For the purposes of this disclosure, sporting activities can include, but are not necessarily limited to, player or team actions or interactions in a game or practice setting or recreational environment or scouting environment. Such sporting activities could be a single event or sequence of events. Sporting activities may further include referee actions and locations, offensive and defensive sets and, player and team matchups, game or event simulations, etc.

For the purposes of this patent application a sporting activity includes, but is not limited to, player, team, referee/umpire/official, coach actions, interactions and/or locations, match-ups (player and/or team), offensive or defensives sets/plays, etc. These sporting activities can occur in any number of settings, including games, practices, drills, scouting environment and/or recreational environment. Sporting activities can also represent attributes of the player, team or official, including strengths, weaknesses, tendencies, or execution dimensions (e.g., speed, quickness, force of hit, path to ball, angle of pass/shot, etc.). Additionally, the terms sporting activity and sporting event or sports activity/event can be used interchangeably.

Recent improvements in acquiring object tracking data during sporting activities have created large datasets that must now be described and analyzed with novel analytic tools. The datasets that list object locations across time consist of large arrays of unfamiliar numerical and textual data that must be processed further in order to identify familiar individual and team activities (for example, an offensive play type in basketball) along with individual and team characteristics during these activities (for example, how the defense played a high screen in basketball). The utility of these datasets is limited without appropriate sport-specific activity recognition algorithms to transform and interpret this data. For example, simply knowing the location of the ball along with the location of each of the ten players on a basketball court does not explain the relationship between the ball and players. For example, the relative locations of the player and ball at any time point do not describe whether the ball is being dribbled, passed or shot. Once the dynamic criteria for game situations and activities are established and the appropriate algorithms are verified, then specific sporting activities can be recognized and characterized. This data can then be used in a variety of meaningful ways to gain better insights into the game and optimize performances and decisions, and provide new information to observers.

Described herein are real-time methods, systems, APIs, user applications and software programs comprising customized and flexible algorithms for comprehensively identifying activities and quantifying characteristics and outcomes of activities that transpire during a sports program (e.g., game, practice, exercise/drill, etc.). The aforementioned system includes an algorithm employing sport-specific and activity-specific pattern recognition methods that depend on flexible, user-defined, criteria for activities and outcomes. These criteria may depend on patterns across time. The algorithms can also be trained to identify criteria for specific activities of interest by inputting pre-selected data from known occurrences of activities. The nature of the data requires a number of specific tools to achieve reliable results with minimal operator input.

In addition to improved analytics, digitally tagging each activity of interest and applying these tags to traditional sports video will enable the creation of a completely searchable library of sports activity footage, both by user and algorithmically generated tags. Easy access to this searchable library of activities will provide value to teams and observers. Teams will be able to, in real-time, retrieve any activity of interest from any game and create compilations of interest that can be easily viewed, discussed and transferred. This ability will improve the efficiency of film review and strategic decision-making by coaches, players, etc. Similarly, by tagging every activity of interest along with all the associated game states (as defined below), viewers can interact in new ways with traditional sports media.

In addition to enabling new interactions with traditional media, accessing newly available information in real time, or in combination with archived information, will enable creation of and interaction with novel sports content.

FIG. 1. FIG. 1a provides a conceptual architecture of an exemplary system in accordance with this specification. The system comprises (a) object tracking technology for acquiring and generating coordinate data corresponding to objects from a playing activity, (b) an event processing module for operating technical computing software for receiving said coordinate data, and other secondary data, and processing software for analyzing, transforming and filtering said coordinate data, and other secondary data, to yield various data sets, (c) a database processing module for storing said data sets and (d) user applications for presenting and allowing the user to interact with said data sets. As shown in FIG. 1a, the user applications for accessing and using the robust data sets available via this technology are many and considerable.

Figure 1B:
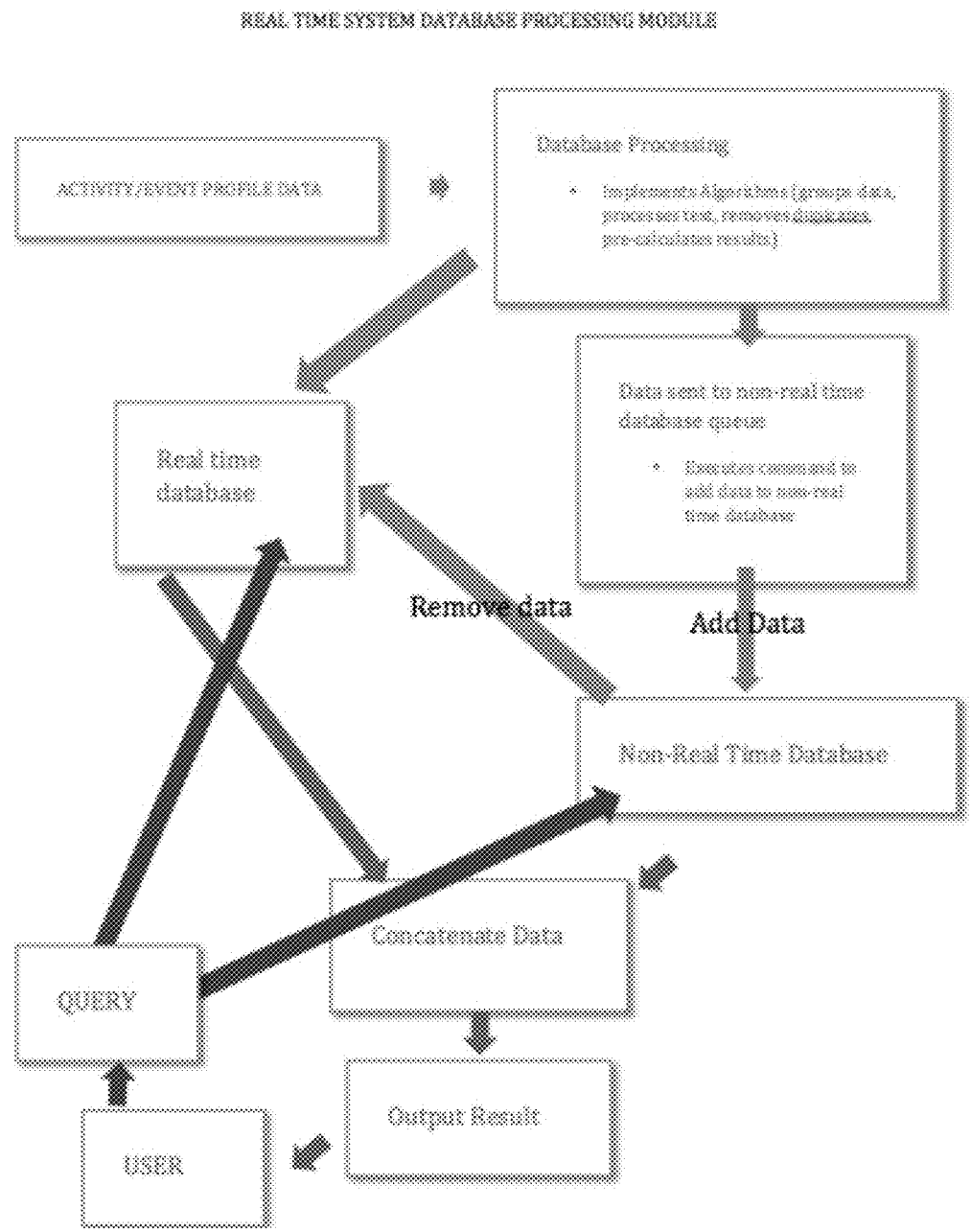

In FIG. 1b, the schematic shows the real time database processing module, in which data flows in from the top, while the user requests (independent of the data) flow in from the bottom. The blue arrows indicate the flow of the data as it is being added to the database, the red arrows show the user requests and the green arrows show the response to the user. Upon entering the real-time database processing system first the data is processed into the necessary formats and added to both the real-time database and a queue, which waits to add the data to the non-real-time-database. As the data exits the queue and is added to the non-real-time database, it is removed from the database in an atomic operation, to ensure there isn't a duplication of data in response to user requests. When the user requests data, the system determines which database the requested data is in, and if in both, the system concatenates the results in the proper way before returning the data to the user.

Acquisition of tracking coordinate data can be accomplished using any number of concepts or techniques. For example, in one embodiment of the system depicted in FIG. 1a, object tracking technology may include a series of cameras local to a playing activity such as a basketball game or practice. These cameras track playing activity objects such as players, referees, officials, balls and other sporting equipment. They use that information to generate data streams, including digital positioning data, corresponding to such objects. These video signals and the associated digital positioning data are transmitted from each camera to a central synthesizer unit, such as a central server. The synthesizer unit processes the video data from each camera and generates coordinate data corresponding to each tracked object.

An exemplary camera-based system may include both hardware and software components. The hardware includes multiple cameras placed local to the sporting activity (e.g., stadium, arena, park, gym, etc.) and processing hardware for analyzing the signals generated by the camera. The cameras track, identify and locate objects on the field. Processors built within each camera process the signals generated by the cameras into data streams, which are directed to a local or remote server. The server then stores the received data as coordinates.

In addition to the camera-based tracking system just described, other tracking technology can be used to acquire tracking coordinate data of a sporting activity. For example, global positioning system (GPS) can be utilized for this purpose, whereby GPS sensors are located on the objects to be tracked. These sensors can be attached to or imbedded within the ball and player equipment (e.g., helmet, shoes, uniform, etc.). These sensors can be configured to track, record and/or transmit data corresponding to object location and movement. Other types of sensors that can be used include radiofrequency identification (RFID) sensors, accelerometers, capacitive sensors, infrared sensors, magnetometers and gyroscopes.

The coordinate data generated by object tracking technology can be in many different formats, including, for example, coordinate data comprising three spatial coordinates and one temporal coordinate (e.g., x, y, z, t) corresponding to each object. Each object can also have distinguishing numeric information matched to its corresponding coordinate data. For example, the distinguishing numeric information for players in a sporting activity can be the players' uniform numbers. Alternatively, the distinguishing numeric information can be more generic, for example, corresponding to the players' generic position (e.g., in basketball, 1 for the point guard, 2 for the shooting guard, 3 for the small forward, etc.). Once the coordinates corresponding to the sporting activity/event are obtained by the object tracking technology, the data can be stored locally until completion of the sports function, transmitted periodically at pre-specified time or transmitted in real time to a remote server for subsequent processing and analysis.

As the object tracking coordinate data is available it is deposited with a central processing unit (CPU) computer and, or, virtual computer for processing. The CPU and, or virtual computer will utilize technical computing software, such as, for example, C++, R, Python or Matlab, that may be compiled or interpreted into a stand alone application, to facilitate processing of the data. This initial processing of the coordinate data may include several steps, including transforming the coordinates to a more usable format, checking the data for consistency and error identification. The CPU or virtual computer is also configured to receive and store additional data from secondary sources, such as, for example, those discussed later. Once the initial processing of the coordinate data is performed, the CPU or virtual computer then performs steps of advanced processing, including, for example (1) error analysis, (2) event/activity recognition, (3) organization into tagged datasets, (4) coupling data with any secondary source information, and (5) stored in a system that allows for flexible, real-time access in multiple formats for the user. Once the information is processed, it may be provided to a user interface or a user application.

Error Analysis

Described here are several error analysis tools that can be implemented individually or in combination to improve the utility of the object coordinate data. As one can imagine, this coordinate data generated by the object tracking technology will contain errors generally comprising of inconsistencies, outliers, missing parts and other limitations that may significantly impair the reliability of the data and create many practical limitations to its application. These limitations present numerous challenges for applying event recognition algorithms, which depend on the fidelity of the object tracking data. For example, there are moments in the game when the tracking tools do not provide position information for all the objects on the playing surface, such as, for example, occlusion artifacts related to optical acquisition methods. In another example, there are times when the coordinates for objects are recognized to be clearly unrealistic and/or contain physically impossible conditions, requiring correction.

The methods and systems described herein may employ one or more algorithms for performing the following steps:

Error identification: identifying moments when errors in the object tracking data are present. For example, the error analysis algorithms include logic sequences to identify activities that are unrealistic and/or improbable. The algorithms may also include processes for identifying inconsistencies or discrepancies in data received from multiple secondary data inputs, such as, for example, play-by-play data.

Error source identification: determining the source of the identified error. For example, the software analyzes the identified errors to uncover the source of errors to properly identify the target for corrective action. Potential sources of error may include hardware outputs, unrecognizable data, indiscernible data, operator error, missing data or incorrectly organized data.

Error logging: errors are categorized by, for example, identifying mismatches between optical data and secondary inputs; errors are described, such as, for example, identifying an error as a physically unrealistic ball movement; errors are counted, including, for example, the number of occurrences and/or the amount of data impacted; and, finally, errors are and logged, by, for example, writing them into a special file. The logs of the errors may be used to assess the robustness of the tracking data and compare the reliability of various data acquisition methods, modalities, and or settings.

Conflict resolution: Depending on the type and source of the error, the software algorithms will operate on the data to eliminate or mitigate the effect of the error. This may include adding or interpolating missing data, reorganizing the data, repairing incorrect data, and/or deleting or disregarding extraneous data. For example, for portions of missing data, the algorithm models the process and enables substitution of the missing data with more realistic data.

Resolution logging: After the error has been identified, logged and resolved, it is still valuable to track and categorize how the error has been resolved. In this step, the algorithm tracks the impact of error resolutions. For example, whether substituted data allows for the capturing of previously unidentified or incorrectly identified activities. This aspect of the algorithm also counts the various types of error resolutions utilized, tracks unresolved errors and maintains a list of the provided solutions and enhancements in a specialized log file for future reference.

Without the error analysis algorithms described herein, the coordinate data obtained from the object tracking technology can often be unusable. For example, common occlusion artifacts associated with optical tracking can have confounding impact on all the dependent activities. If the ball is momentarily (or for an extended period of time) hidden from the camera as the player drives to the hoop (or the equivalent for non-optical tracking techniques, e.g., momentary sensor malfunction), then the activity recognition patterns that rely on the ball conditions won't be registered without a robust error analysis platform that can re-introduce the missing ball conditions.

Activity/Event Recognition

The technology described herein includes sport-specific algorithms that recognize specific activities and/or events to intelligently account for situations that occur in games. Spatial and temporal patterns associated with such activities and/or events are prescribed (or learned) based on game situations. These activity recognition patterns are complex and may depend on error analysis tools, such as those described above, for proper processing along with spatial and temporal cues from surrounding objects and/or secondary data sources. In one example, when the coordinate data for two basketball players indicates that both players are in close proximity to the ball, the algorithms may be used to determine which player is actually in possession of the ball. Activity recognition algorithms may be employed to account for past, current and future patterns of all players on the playing surface.

Using the available tracking coordinate data, the activity recognition algorithms can identify and characterize activities of interest based on the positioning of objects of interest (e.g., players, ball, etc.) at precise and coinciding times. The activity recognition algorithm can also look for and characterize sub-activities of interest corresponding to identified activities of interest. Tables 1, 2 and 3 provide exemplary lists of the types of events that can be identified and categorized during basketball, football and baseball activities, respectively.

In addition to activities of interest, outcomes of activities of interest can be identified using subsequent activity recognition algorithms that identify objective and/or subjective outcomes. Examples of objective outcomes include whether a shot went into the basket or not. Subjective outcomes include whether a team played good defense or poor defense. Criteria for "good" or "bad" activities can be established in advance and can be customized to be consistent with unique game strategies. For example, in basketball, allowing an open shot attempt may be considered a "bad" defensive possession, however a given defensive game plan may be designed to encourage specific offensive players to shoot open shots from a minimum distance away from the hoop. In these cases the user-defined criteria would cause these outcomes to be considered "good" defensive possessions.

Parameters used to identify and categorize activities can be flexible or rigid and can be defined by the user. In the case where parameters are user-defined, the selected criteria may be based on subjective definitions of specific activities. The criteria for activity recognition can be determined in advance of recognizing specific activities in a game. In contrast, manually identifying moments in a game where specific activities occur can be used to train the algorithms to define criteria that would identify the activity of interest throughout the game. For example, knowing that a particular offensive set occurred at some number of specified sequences in a game could allow the system to process the object tracking data from those sequences and define an algorithm trained to identify all the common interactions that occurred during each of the specified sequences, and the newly developed algorithm could be used to identify other sequences containing the same patterns. The training algorithm could be modified over time as new sequences are introduced in the training process.

Activity recognition algorithms are prescribed in a hierarchical manner, permitting some activities to either occur simultaneously with other specified activities, or preclude the occurrence of other specified activities. For example, in basketball, a player that catches the ball on a "hand-off" might also satisfy all the conditions for a "catch off screen" play. In this instance, however, the recognition and characterization algorithms may pre-specify that the occurrence of a "hand-off" should disallow the occurrence of a "catch off screen." Additionally or alternatively, activity recognition algorithms can be combined with data corresponding to activities that have previously occurred in order to accumulate historical data for activities of interest.

In one embodiment of the technology described herein, object locations can be analyzed in conjunction with other independent datasets. For example, textual play-by-play data, which is generated during a game or other sporting activity by an independent source, can provide complimentary game information and can be utilized as supplementary information for activity recognition algorithms. Activities recorded manually and documented in play-by-play data can be synchronized to the object tracking data by matching consistent time recordings within a specified time difference. Thus it may not be necessary for the time resolutions of the independent data sets to be similar. A synchronization algorithm in the error analysis software checks for consistency between multiple data sets. As discussed above, when inconsistencies are identified, conflict resolution algorithms are employed to ameliorate differences.

Game states, which include game-related parameters (teams involved, rankings of teams involved, tendencies of teams involved, future and past team schedules, importance of game, game site, time remaining in game, score differential, etc.) or team-related parameters (current roster, players on court, players off court, opponents on court, opponents off court, player positions, player roles, etc.) or player-related parameters (player tendencies, player salary, recent performances, etc.) can be calculated or processed by the CPU/virtual computer using software or obtained from a secondary data source such as a statistics database or other database directly compiled from the activity recognition algorithms. This "game states" data can be used for context in conjunction with activity/outcome recognition algorithms to facilitate identification and categorization.

Since large amounts of data that accompany high-resolution (spatial and/or temporal) recordings impose constraints on logic parameters, particularly when data from past activities are being stored for reference, it may be beneficial to employ data optimization tools and techniques. Optimization tools allow the analyses to be readily available in real-time and accessible via mobile devices. For example, one type of data optimization tool might be to set up the architecture of the code to allow the runtime memory usage to be essentially constant or linear in data size for all real-life data sizes. This technique enables the data to be accessible by the algorithm in small sequential portions rather than as an entire file.

Organization into Algorithmically Tagged Datasets

Once all activities/outcomes of interest and game states are identified they need to be categorized, filtered and, ultimately, organized in a comprehensive output file as event/activity profile data. This event/activity profile data may include data for each identified event, including event descriptions, times, outcomes, game states, players, referees/officials/umpires, ball position, kinematic data, etc. Event/activity profile data may also include outcomes of historically similar situations that can be used predictively to determine expected success/failure rates of various decisions or performances. The event/activity profile data may also include or be coupled with secondary source data. The output file would be entirely searchable based on pre-defined or user-defined criteria (discussed later).

As mentioned above, one useful aspect of the output file is that it resides within a searchable database. The searchable database may be processed to anticipate common user queries, or aggregate information for all available permutations. The searchable feature is predicated on successful implementation of data filtering algorithms that tags and properly categorizes substantially all activities/events, outcomes of interest, game states, and object characteristics. The searchable database can then be filtered in real-time based upon predefined and user-defined heuristics that provide maximum search flexibility for the user. For example, in basketball, the user may be able to search for only those events having a one-on-one matchup of two particular players, such as, for example, Player A vs. Player B and have access to all related event profile data associated with that particular matchup.

In one illustrative example, the analytics system described herein may be configured to identify specific plays that lead to outcomes of interest, such as, for example, desired or preferable outcomes and recommend specific actions that alter those results. In basketball, the play identification might be based on a points per possession (PPP) metric, whereby a favorable outcome is that which yields a higher PPP relative to the individual, team or league average. In any case, this metric, or one similar in terms of preference, may be specified by the user. The analytics system allows the real-time querying of all sequences that result in the specified outcome of interest. The system can then group the sequences leading up to the desired outcome by the events that were contained in the preceding sequences, such as, for example, the play types. The system may further group the sequences leading up to the desired outcome by the degree of correlation with the specified outcome of interest, such as, for example, the highest PPP. The system allows for output in arbitrary formats including, but not limited to JSON, Text, Image, Video/Animation, and interactive diagrams.

As part of the filtering capability of the analytics system, which may be based on predetermined or user-specified criteria, output may be created which are designed to include all event profile data associated with the selected criteria. This event profile data may include all events and outcomes of interest responsive to the searched criteria as well as all related statistical data. Table 4 provides an exemplary list of categories of searchable criteria.

Upon availability of a searchable database containing event profile data, the analytics system can be configured to generate output files containing activity descriptions and/or outcome descriptions and in-depth game and activity analytics. In one embodiment, the analytics system can be configured to automatically generate output files containing activity and/or outcome descriptions that yield dynamic game plots with automatically generated narratives describing the activity/event profile data. In another embodiment, the analytics software can be configured to merge or couple activity and/or outcome descriptions from output files with traditional sports media in order to convert the media into an entirely new content-type, including a comprehensively searchable platform.

In yet another embodiment, the analytics software can parse data files according to selected parameters, such as, for example, activity type, location of activity, players involved, time remaining in game or score margin, which would automatically provide figures, dynamic plots, and tables from select portions of the game. Additionally, this data can be used by the analytics software to determine what outcomes occur following specific activities or what activities lead to specified outcomes, such as, for example, in basketball, what happens when a team goes "under" a high screen or what strategies allow the opponent to attempt open shots. As such, this software can be used to determine what types of plays may lead to future desirable or avoidable situations, such as, for example, what offensive plays are most likely to lead to opponent transition opportunities.

In another embodiment, the analytics system can also be used to quantify comprehensive team and individual characteristics as an activity occurs. For example, in basketball, as a shot goes up the software can simultaneously quantify location of shot attempt, likelihood of shot going in based on activity conditions, proximity of nearest defender to shooter, players boxing out to gather rebound, player moving backwards to defend transition opportunities, etc. As such, the system can be configured to deliver surrogate data to create estimates for the likelihood of makes or misses based on history for player and location. In addition, profiles of teams, players, games and other captured segments of sports can be automatically generated using activity/event profile data.

As described above, access to a searchable database of event profile data enables the system to identify all types of outcomes/events of interest associated with a particular sporting activity. This enables any number of analytics data products, whereby the system automatically generates real-time output, which includes the identification of outcomes and/or events of interest as well as the presentation of related event profile data, such as, for example, players, teams or probabilities. As will be described later, a robust user interface or multiple user interfaces will allow the user to participate in the types of analytics and output produced by the software.

It may be desirable for the analytics system described herein to be able to intelligently adapt to new circumstances and/or identify new conditions that may impact the analytics output. As such, the analytics system may benefit from having an adaptable algorithm, which can be trained to identify new sets containing previously defined and recognized events or patterns of events. For example, the system can be configured with an adaptable algorithm, which identifies an event of interest in numerous sequences of tracking coordinate data. The system groups the similar sequences of tracking coordinate data associated with the common event of interest and identifies sub-events or conditions contained within these sequences based on preexisting event recognition algorithms. With this information the software can then generate an event recognition algorithm specific to the newly-identified play, thereby enabling the software to identify and categorize the play in future sequences. Additionally, since the tracking data may be stored and accessible, this new event recognition algorithm could be applied retroactively to reanalyze and characterize or re-characterize previous sporting activity data.

The use of adaptable algorithms may enable the analytics system to increase complexity. For example, in the case of basketball, the software might not be configured to recognize a particular type of offensive set known as the triangle offense. However, based on the coordinate data, the software is "trained" to group and commonly categorize all offensive sets that have the same or similar sequence of events. Once these events are grouped, event profile data, such as, for example, player locations, screen locations or post entry pass locations, can be collected and aggregated. Moreover, this event profile data can enable the user to identify events and/or outcomes of interest related to the triangle offense, such as, for example, which option off the triangle offense set generates the most space for the shooter on a perimeter catch.

This adaptable or training algorithm technology has the potential to add considerable value to the analytics system described herein. Firstly, this algorithm technology can help improve the event recognition software by optimizing event defining parameters. Secondly, once newly-learned event recognition algorithms are tested for reliability, they can be implemented retroactively to improve the larger dataset retroactively. Lastly, the software can be configured to interface with users such that newly-identified play sets are brought to the user's attention so that the user may make custom adjustments.

Additionally, using the technology described herein, the event profile data may be used to couple to, synchronize or merge the tracking coordinate data with related video media. One way to achieve this particular feature would be to apply adapted image processing methods to the video media of a sporting activity such as, for example, a game broadcast, to identify game states type data, such as, for example, time remaining, period, team, location, score or score differentials. This data obtained from the video image processing would be automatically associated with the event profile data generated from the corresponding object tracking data. For example, the time, period and score data from a video broadcast of a particular game can be optically discerned and cross-referenced with the same data obtained from the object tracking coordinates. Using this approach, this cross-referencing would link the video to the event profile data and associated analytics for all events of interest.

This video coupling technology has numerous appealing applications. The user can search, parse, retrieve and transfer any activity of interest inside or alongside video. For example, for any event or outcome of interest identified using the analytics software, the video clip of that particular event would be readily available to the user for further analysis. This technology could also make the video itself the vehicle for the analytics, such as, for example, by making the video data searchable via a database, whereby the event profile data, and quantitative and qualitative event attribute data therein, is embedded within or graphically overlaid on the video media.

Coupling Secondary Source Data

As described above, the event profile data resulting from analysis of object tracking coordinate data can have significant analytical and statistical value. This value can be increased by coupling secondary source data to the event profile data. This secondary source data may include any of the following: present or historical statistical information on the players, team or venue, such as, for example, game states data; play-by-play data; video or audio media, such as, for example, television, internet or radio broadcasts, player highlight reels, or game announcements; object attribute data, such as, for example, player size, position, salary, education, college experience, intelligence, other professional experience or injury status. Data collected from user interaction will also be viewed as a secondary data source and will be used to identify new events and tailor output to user preferences. This secondary data coupled with the event profile data may create a database of highly robust, searchable data. Both the Event-Processing Module and the Database-Processing Module can be augmented by secondary data for increased utility.

Real-Time System Architecture

The variety of new applications created through the accessibility of new and timely information necessitates application-specific system architectures and methods for information storage, processing and distribution. The event profile data can be stored and processed for non-real time applications and saved on disk, enabling extensive and lengthy optimization processing of the database prior to querying. In addition, because users will interact with information during the same events that the data is created, there is a need to allow access to our data in real time. However, because there are many optimizations performed upon the data in order to make querying it as fast as possible, it is not trivial to add that data to a non-real time database, since that process takes some amount of time. In order to allow users to access the data in real time, the system can add new data to both a fast, in-memory database that is able to be accessed very quickly and a queue, which guarantees the data is eventually added to a larger non-real time database (see FIG. 1b).

Application Programming Interface (API)

The variety of applications realized from the output and timely accessibility of newly available activity/event recognition provides the impetus to develop unique public and private APIs to serve as a layer between backend activity/event profile data and frontend user applications, that would adhere to customized logic and perform unique functions on data depending on access, privileges, and intended use. For example, a private API, enabling control over permissions to use and access information, provides a set of structured tools to query the event/activity profile data. This set of tools allows developers to create, iterate, integrate and add novel applications. A public API would allow individuals and organizations access to write software for the platform or build their own data applications. Examples of applications created with the API include the mobile and web applications of activity/event profile data, second screen applications of activity/event profile data and data visualizations of activity/event profile data.

User Interface and Applications

As mentioned above, the analytics software and system described herein enables enhanced sports analytics through the creation of a searchable database comprising event profile data corresponding to and resulting from object tracking coordinate data associated with a sporting activity. While much of the value and utility of this software and system may reside in the database and proprietary datasets therein, it is valuable to have robust applications and interfaces to facilitate access to the data and unlock this utility. Described below are several user applications for leveraging the datasets described above.

The interface used to facilitate creation of and access to this data can vary depending on the type of analytics desired by the user. The interface may comprise many selectable fields and menus. Alternatively, the interface can be completely graphical, having many dynamic features. The accessibility of the interface may also depend on the desired analytics and user requirements. For example, the entire system (e.g., analytics software, database and interface) can reside on an individual computer. Alternatively, a portion of the system might reside on a remote server. For example, the analytics software could be cloud based. Still alternatively, the entire system might be virtual whereby the user can access the interface via a website. In another configuration, the interface may take the form of a mobile application that can run on a smartphone or tablet, such as, for example, an iPad.

Once the object tracking coordinate data corresponding to a particular sporting activity (e.g., basketball game) has been obtained and the event profile data for activities, events and outcomes of interest has been categorized and archived in a searchable database, numerous potential applications are envisioned. When the searchable database also includes a robust set of secondary data that is linked to corresponding event profile data, the utility of this technology has even greater potential.

Figure 2A:
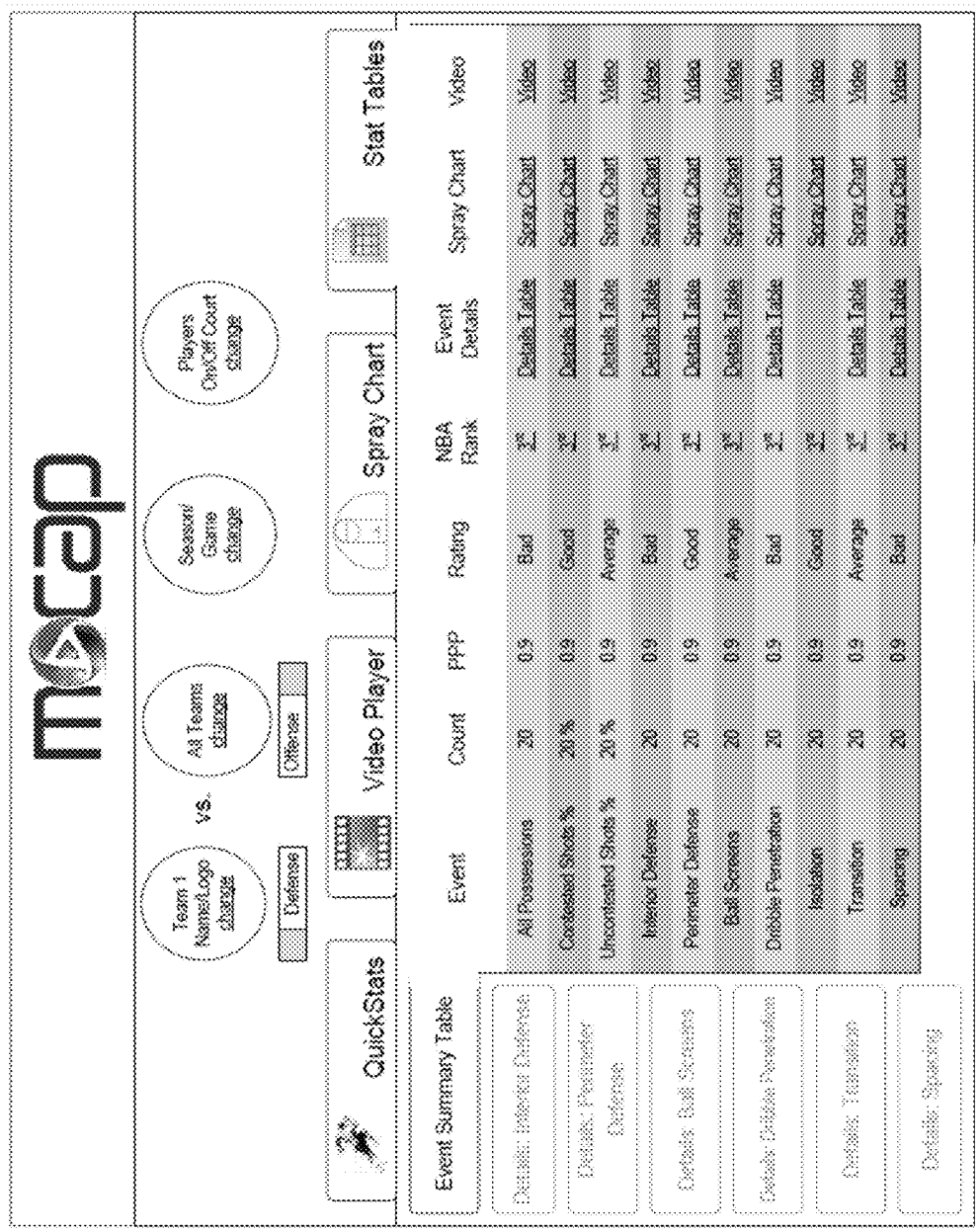
FIGS. 2a and 2b are illustrations of an exemplary user interface for providing enhanced sports analytics via Stat Tables according to one embodiment of the invention.
Figure 2B:
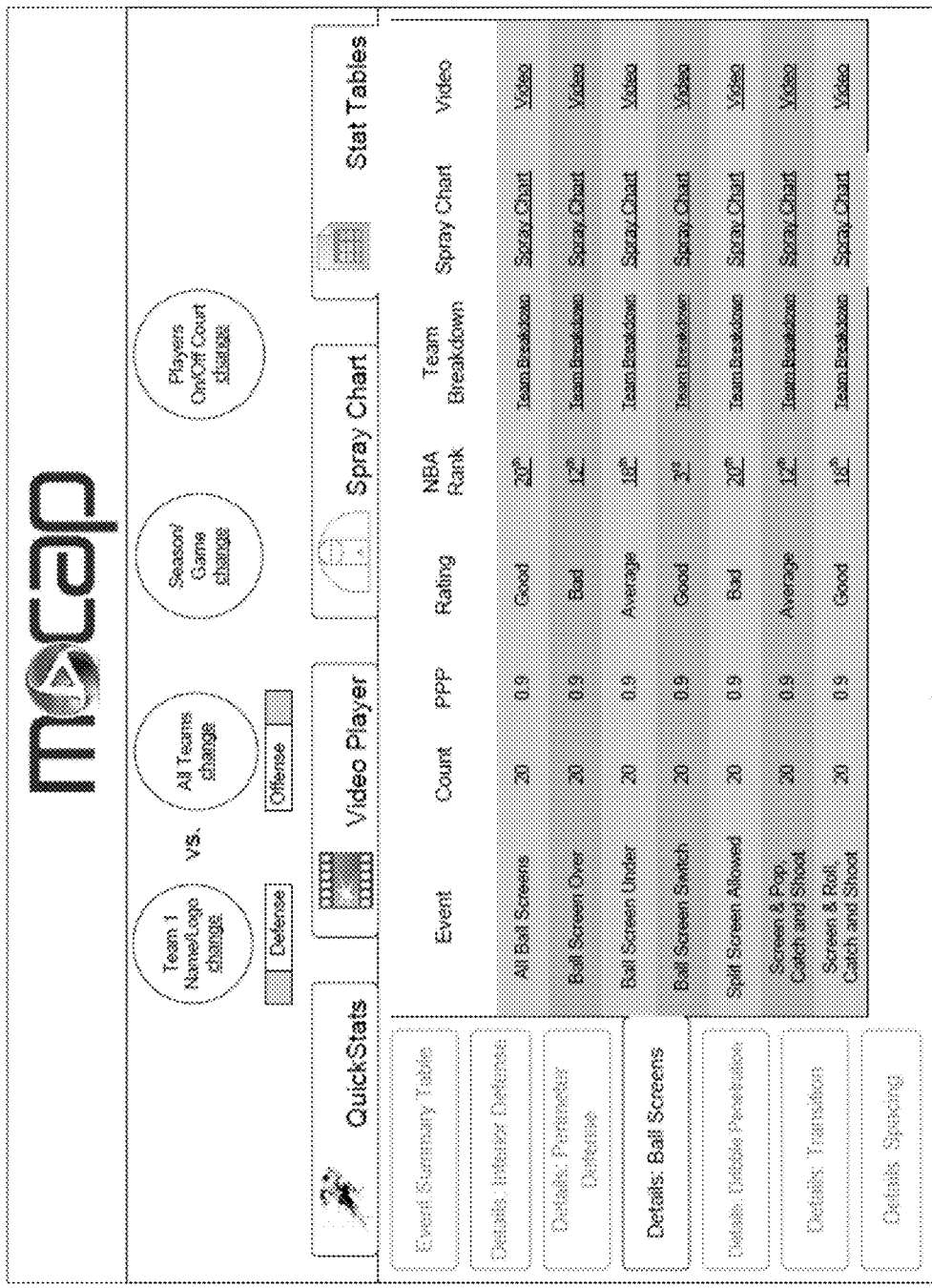

FIG. 2. In one embodiment, the event profile data is made available to the user via a multitude of data rich tables. FIGS. 2a and 2b depict an exemplary user interface for providing enhanced sports analytics via many "Stat Tables". This type of interface demonstrates the robustness of the event profile data as it presents a detailed statistical and analytical breakdown of a basketball game. Data is available based on a specific team, game, matchup, season, etc. and may be organized according to certain types of events or play types. As shown in FIG. 2a, the analytics can be presented as a summary table that enables the user to select tables possessing more detailed data such as that in FIG. 2b. Alternatively, as described in greater detail below, the interface can be an application comprising multiple selectable fields, which enable the system to provide the user customized analytics consistent with the user's preferences.

Dynamic Game Plots

The proprietary dataset created from the object tracking coordinate data may describe nearly each and every event in a particular sporting activity. This would allow the reenactment of the entire sporting activity, the replay of a particular segment of the sporting activity and/or the enhancement of currently available modalities (e.g., broadcast, highlights, etc.).

Figure 3:
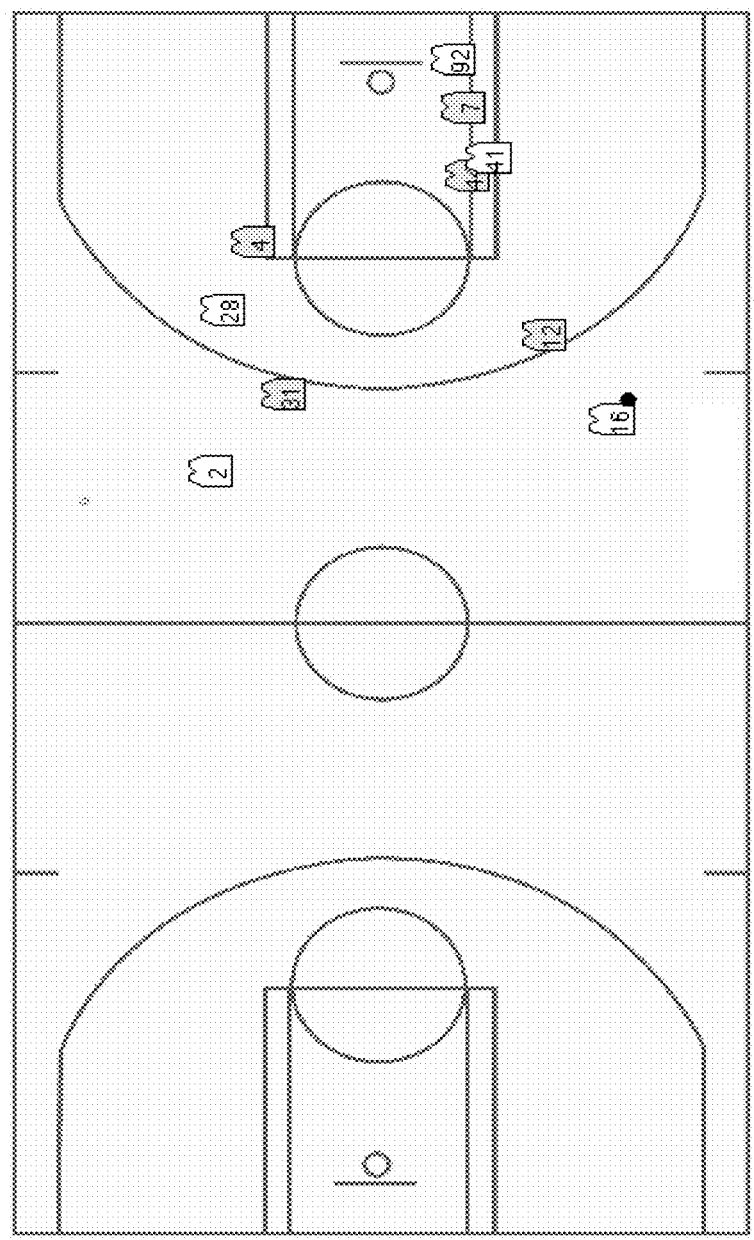
FIG. 3 is an illustration of a two-dimensional animation of a sporting event according to one embodiment of the invention.

FIG. 3. In one embodiment, as shown in FIG. 3 for a basketball game, a two-dimensional animation of the sporting event is presented. This animation depicts the position of the ball and players in accordance with the tracking coordinate data. The animation can reenact the entire game or just the highlights. The animation can be played at some time during or after the game. If during the game, the animation could be played in real-time. Additionally, the animation can be displayed on TV, viewed on the internet, streamed to a mobile device.

Figure 4:
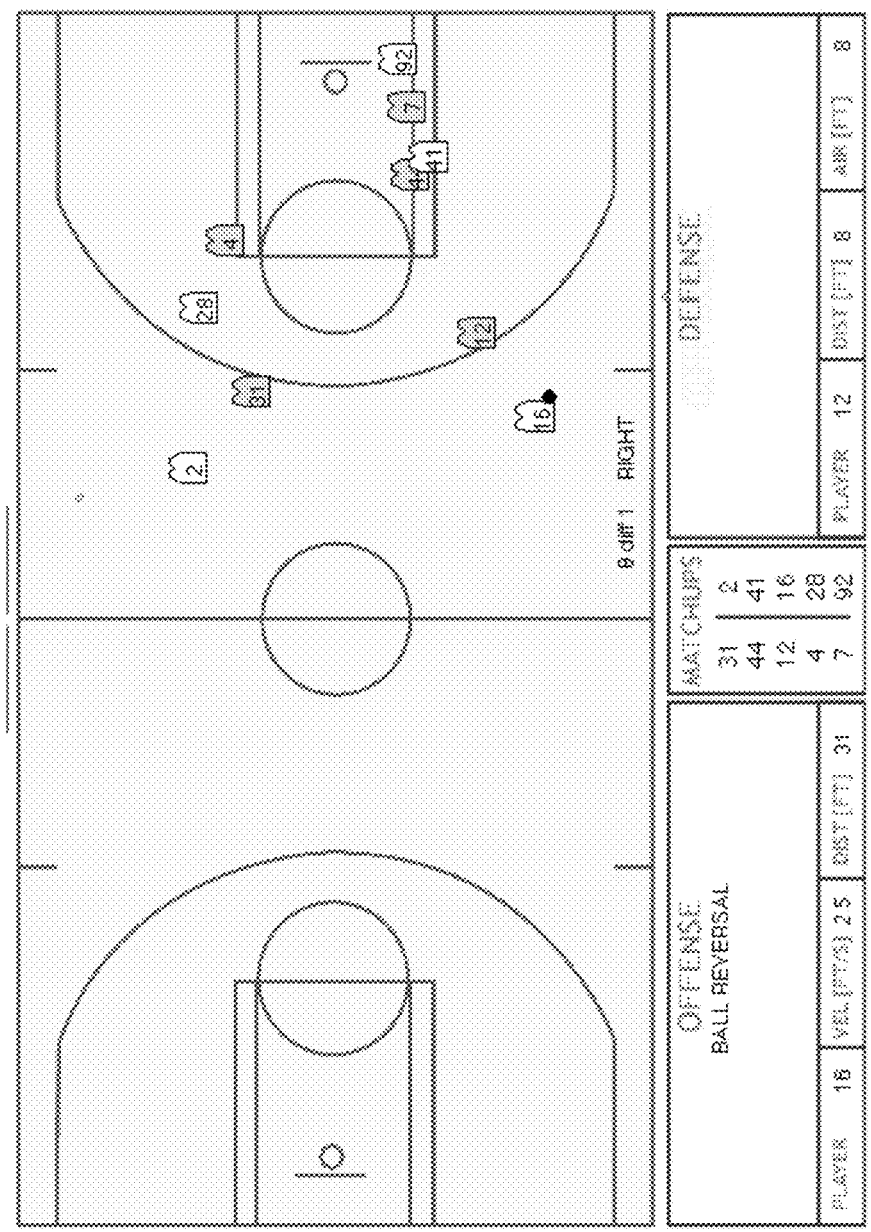
FIG. 4 is an illustration of a two-dimensional animation of a sporting event including additional contextual data according to one embodiment of the invention.

FIG. 4. In another embodiment, as shown in FIG. 4, additional contextual data can be displayed along with the animation to enhance the viewing experience, including, for example, coupling with an automatically generated narrative from the activity/event profile data. For example, players can be identified by uniform number or unique symbols while teams can be identified using logos and/or distinctive colors. Other types of event profile data can also be provided such as event tags (e.g., play identification), player matchups, scoring, etc. Additionally, analytical data such as shooting statistics, probabilities, kinematic data (e.g., current speed of ball handler) can also be provided. This information can be provided using visual graphics and/or audio (e.g., sounds, announcements, etc.).

Given that the event profile data generated from the object tracking coordinate data can be produced via automated processes (i.e., algorithms), the resulting datasets are more repeatable and consistent than the play-by-play data that is collected and recorded manually. In one embodiment, the event profile data contains textual play-by-play data merged in from a secondary data source. In such a case the software contains processes to compare the event characterizations and statistical information to the textual play-by-play and reconcile any discrepancies such that the data resulting from analysis of the object tracking coordinate data is consistent with the "official record" play-by-play. In another embodiment, the event profile data is used to replace the play-by-play data such that the event characterizations and statistics collected about the sporting activity using the methods and technologies described herein become part of the official record of that particular sporting activity. In this embodiment, since the event characterizations and statistical information is generated from the object tracking coordinate data in an automated fashion, the resulting play-by-play data can be generated in "real-time", considerably more efficient than the conventional, manual, subjective play-by-play.

Figure 5:
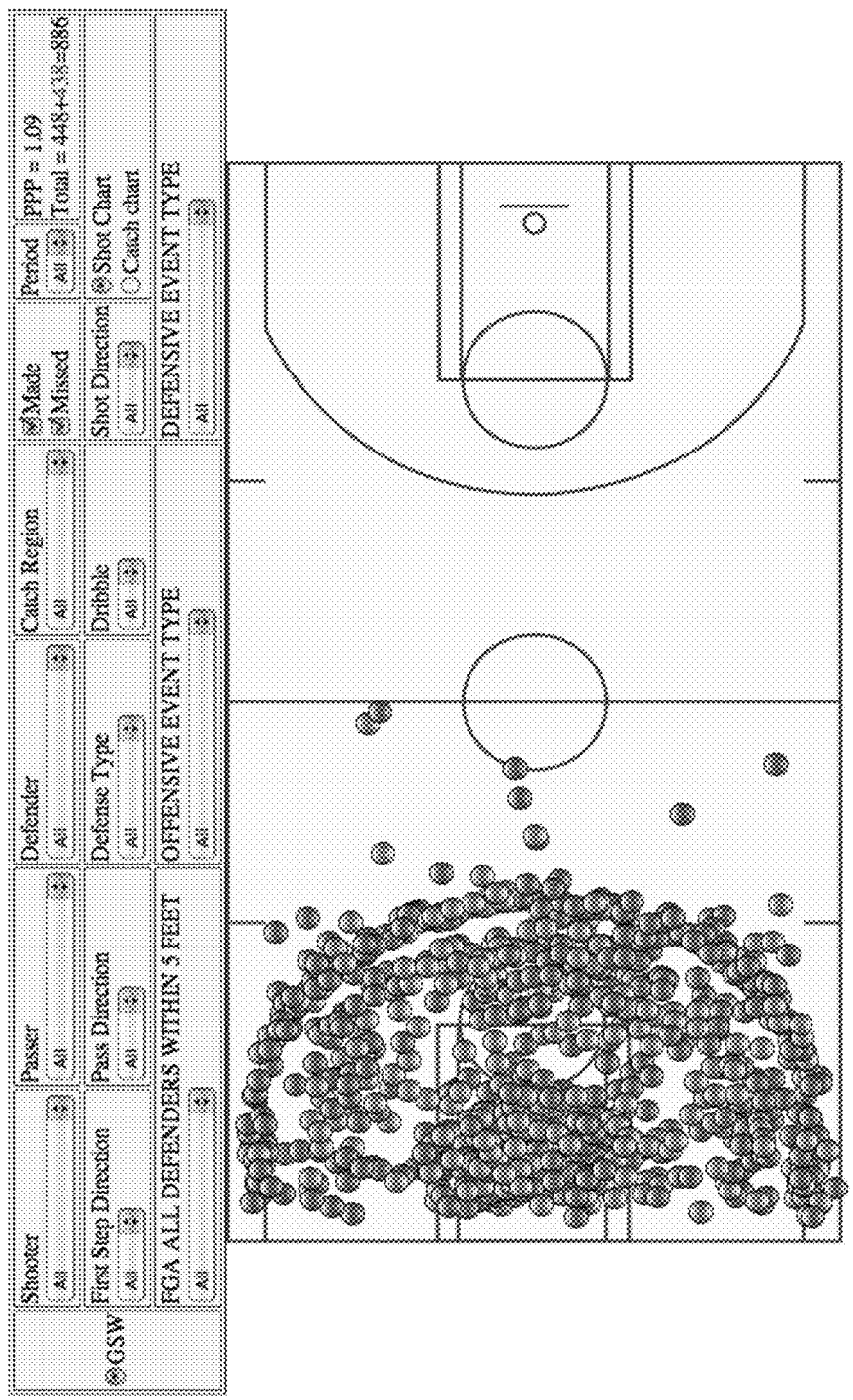
FIG. 5 is an illustration of a two-dimensional animation of a sporting event including a shot chart according to one embodiment of the invention.

FIG. 5. The availability of event profile data that catalogs and describes nearly every event, play, sequence, etc. of a sporting activity enables a multitude of analytical viewing options. For example, FIG. 5 depicts a "spray chart" showing all of the shots taken by a particular team/player over a period of time (quarter, half, full game, season, etc.). The shots can be color or shape coded to differentiate between successful shots and missed shot attempts. Color or shape coding can also be used to identify the degree of difficulty based on any number of factors (e.g., when the defensive player is within a certain distance from the shooting player at the time the shot was taken). This spray chart is not limited to shots, rather it should be viewed as a generic visual representation of the aggregate and/or probabilistic data of any of the activity/event profile data on given regions of the court/field/pitch.

Figure 6:
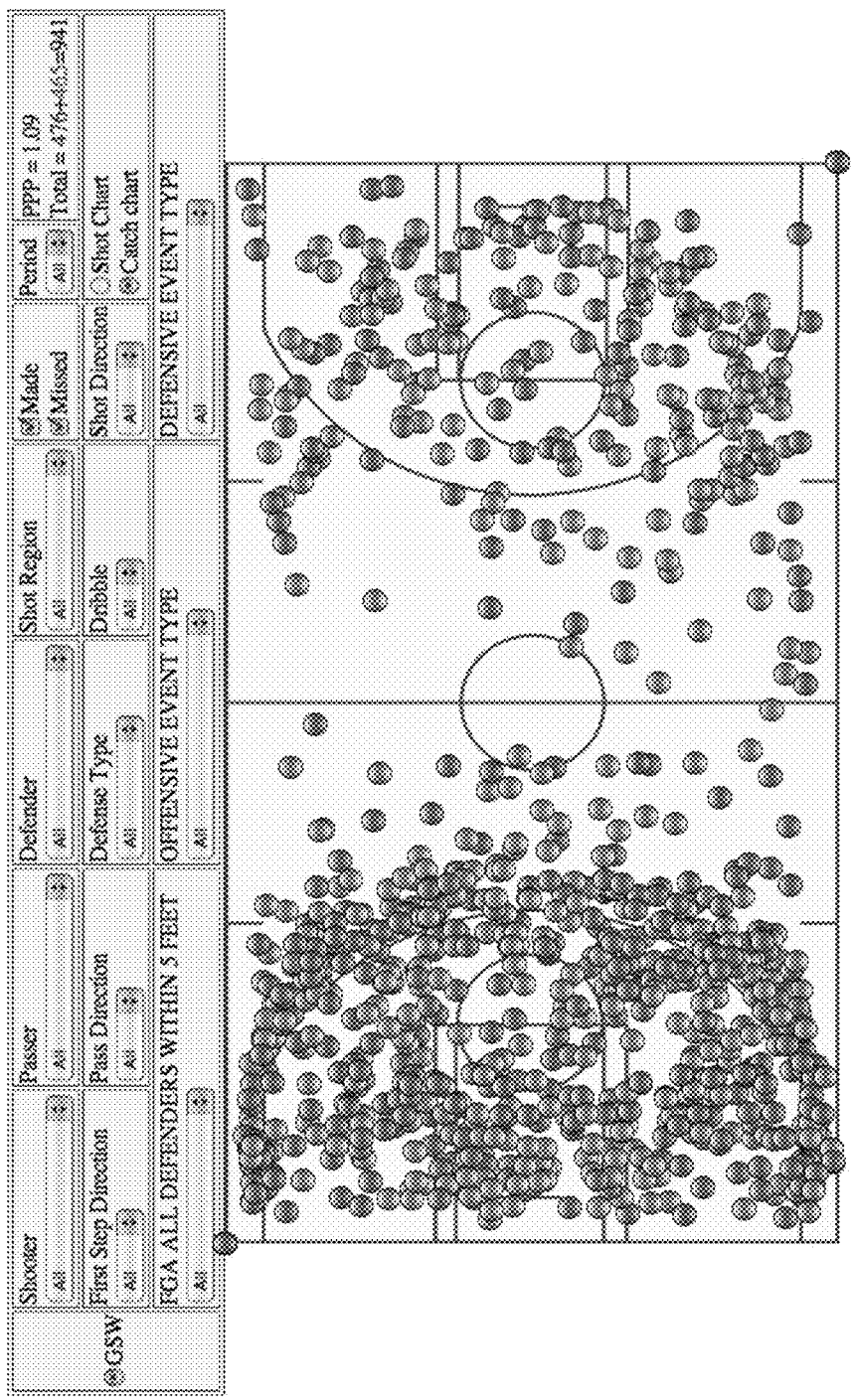
FIG. 6 is an illustration of a two-dimensional animation of a sporting event including a catch chart according to one embodiment of the invention.
Figure 7:
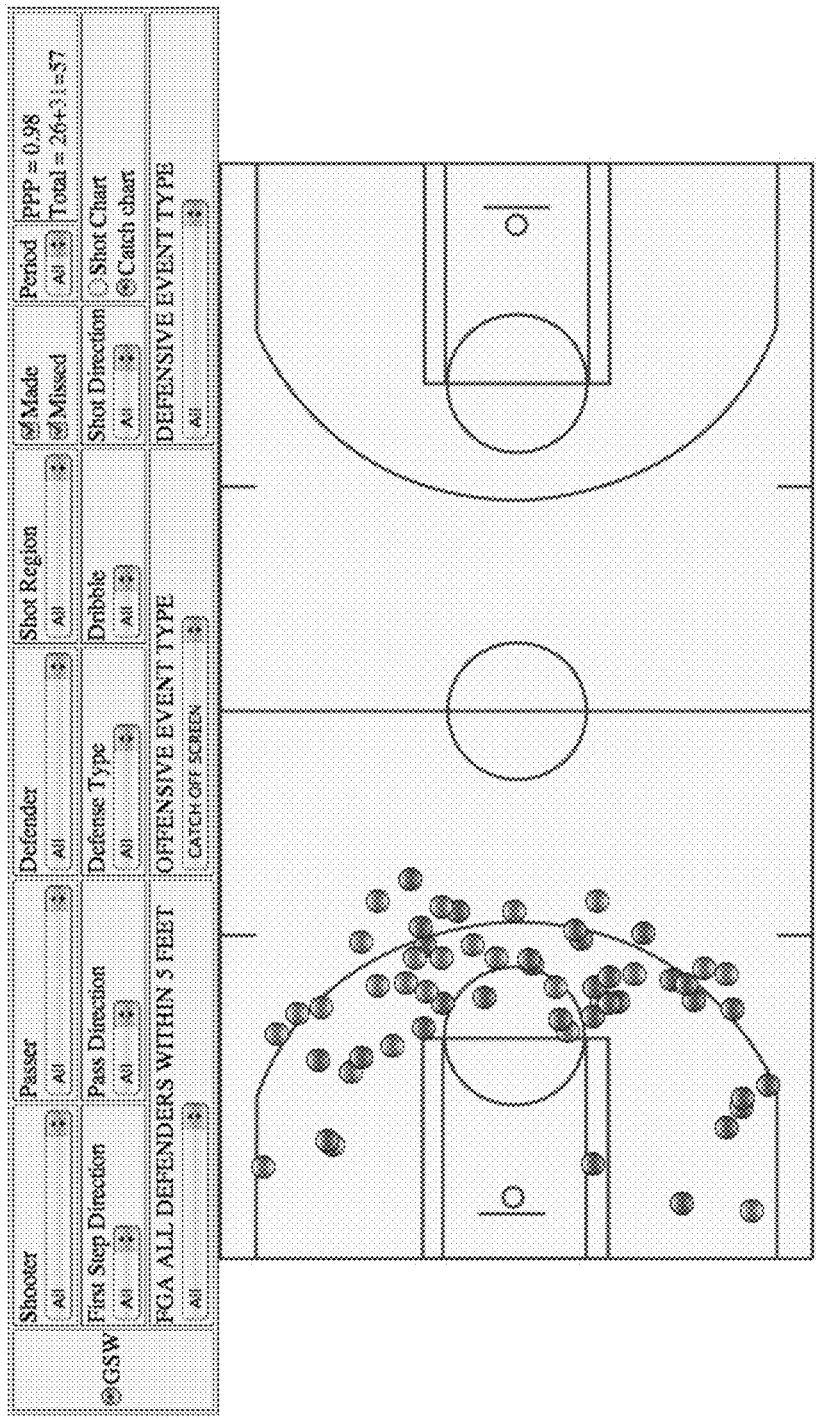
FIG. 7 is an illustration of a two-dimensional animation of a sporting event including a catch chart according to one embodiment of the invention.

FIG. 6. and FIG. 7. Given the robustness and overall flexibility of the dataset, many types of charts and other visual graphics can be generated from this data. For example, FIG. 6 provides a "catch chart" that identifies where on the court a shooter caught the ball prior to taking a shot. This type of data is not available from other sources (i.e., the conventional, manually-obtained play-by-play) may in combination with other event profile data (e.g., number of dribbles after the catch, etc.) can provide an additional dimension of information and analytical perspective. For example, FIG. 7 provides a catch chart corresponding to shots taken after a particular offensive event occurs (i.e., shooter catch after screen on defensive player). As will be described in greater detail below, this type of analytics will enable the evaluation of performance and determining strengths, weaknesses, tendencies, etc. over a large amount of data (e.g., multiple games/seasons). Moreover, as will be discussed in greater detail below, much of the output and graphics is highly customizable to user preferences. The menu selections shown in FIGS. 5, 6 and 7 provide a non-comprehensive view of the types of filters that can be applied to customize the output of the dataset.

As mentioned above and as will be discussed in greater detail below with respect to video archiving, event profile data corresponding to particular events during a sporting activity can be linked to video media corresponding to those events. This feature has profound implications on the utility of this technology since it enables a user to access video footage for any event captured in the event profile data of a particular sporting event. For example, the technology described herein can be used to automatically generate a gamecast (i.e., dynamic game plots) of a particular event. This gamecast and event profile data within will enable the user to parse and filter the data to identify events/outcomes of interest (e.g., plays, sequences, possessions, player scoring attempts, etc.). Since video footage is linked to the event profile data that is responsive to the user's queries, the user will be able to view video clips corresponding to all desired event and outcomes of interest.

In another embodiment, the proprietary dataset described herein can be used to generate a 3-dimensional reproduction of the sporting activity. Rather than the viewer following a 2-dimensional gamecast, the display can present the gamecast in 3-D. Alternatively, the system can generate holograms to facilitate viewing of the gamecast. For example, holographic images can be used to depict the tracked objects (e.g., players, ball, etc.) of a game and provide a real-time or delayed animated recreation of the game in 3-D. Alternatively or additionally, event profile data could also be presented as holographic images. For example, event profile data could be presented as part of the 3-D animation mentioned above or as holographic images during the sporting activity itself (e.g., holograms displayed in the arena) for the viewing audience.

Customizable User Analytics Platform

As mentioned above, the robust and densely populated datasets residing within the output file as event profile data enable a high degree of flexibility and customization in the analytical output of the system. Since the event profile data already contains activity data that is parsed, sorted and stored with many quantitative and qualitative descriptive tags, the user has many options to select from in generating the desired output. For example, if a user wanted to know which players have the highest shooting percentage following execution of a particular play set (e.g., pick and roll) on a particular region of the court, the user can make the appropriate selections from the available fields/filters to generate the desired analytics. If the user sought information on a particular player, the user can select the player's name in the application. Similarly, other fields of interest can be adjusted or specified to generate analytics of interest to the user.

Figure 8:
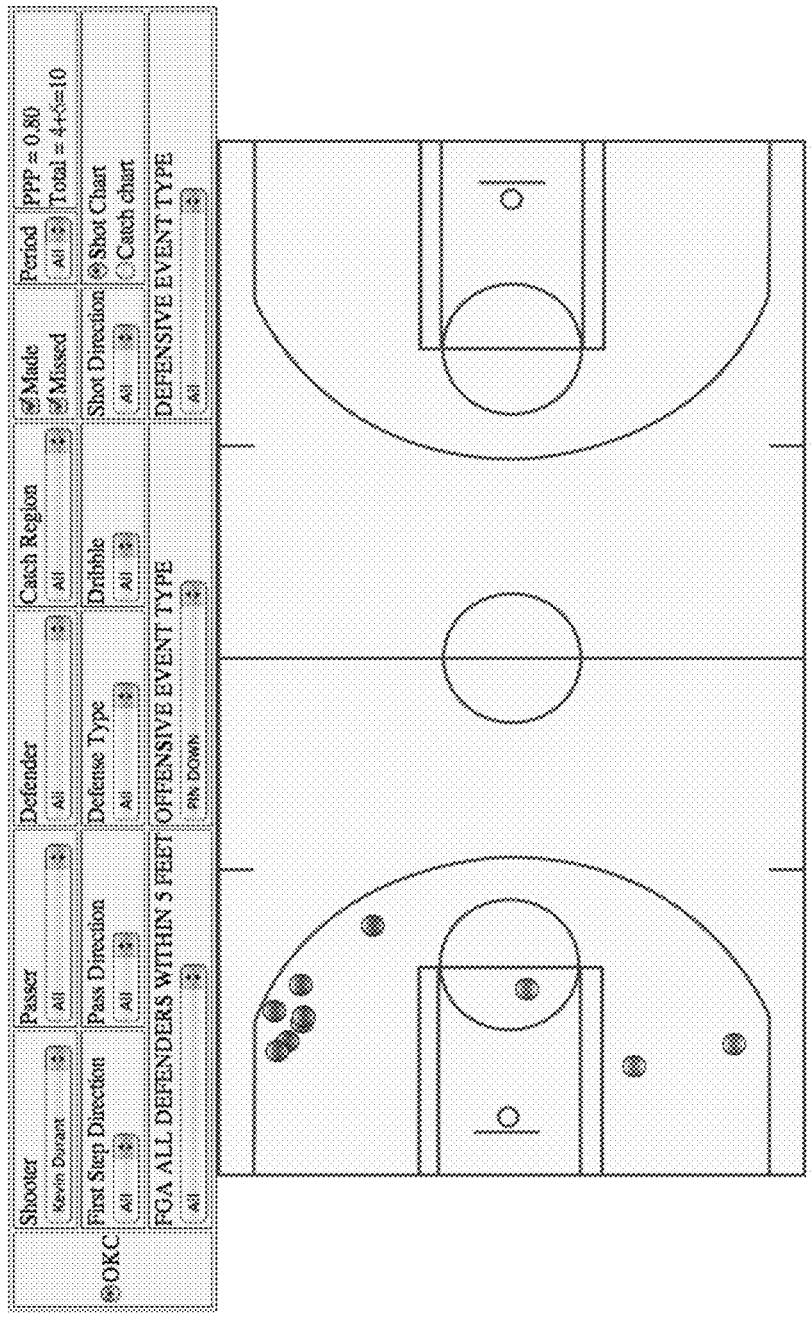
FIG. 8 is an illustration of an interactive user application/interface according to one embodiment of the invention.

FIG. 8. FIG. 8 provides an exemplary embodiment of an interactive user application/interface that enables the user to specify the analytics for display.

More specifically, based on the user's selection of a particular player (i.e., Kevin Durant) and offensive event type (i.e., pin down), the analytics system identifies the possessions that meet these criteria and plots the shots taken by the player following the offensive event. The application also shows which possessions resulted in a successful or missed field goal and provides a points-per-possession metric (PPP) associated with all possessions that meet the user specified criteria.

Figure 9:
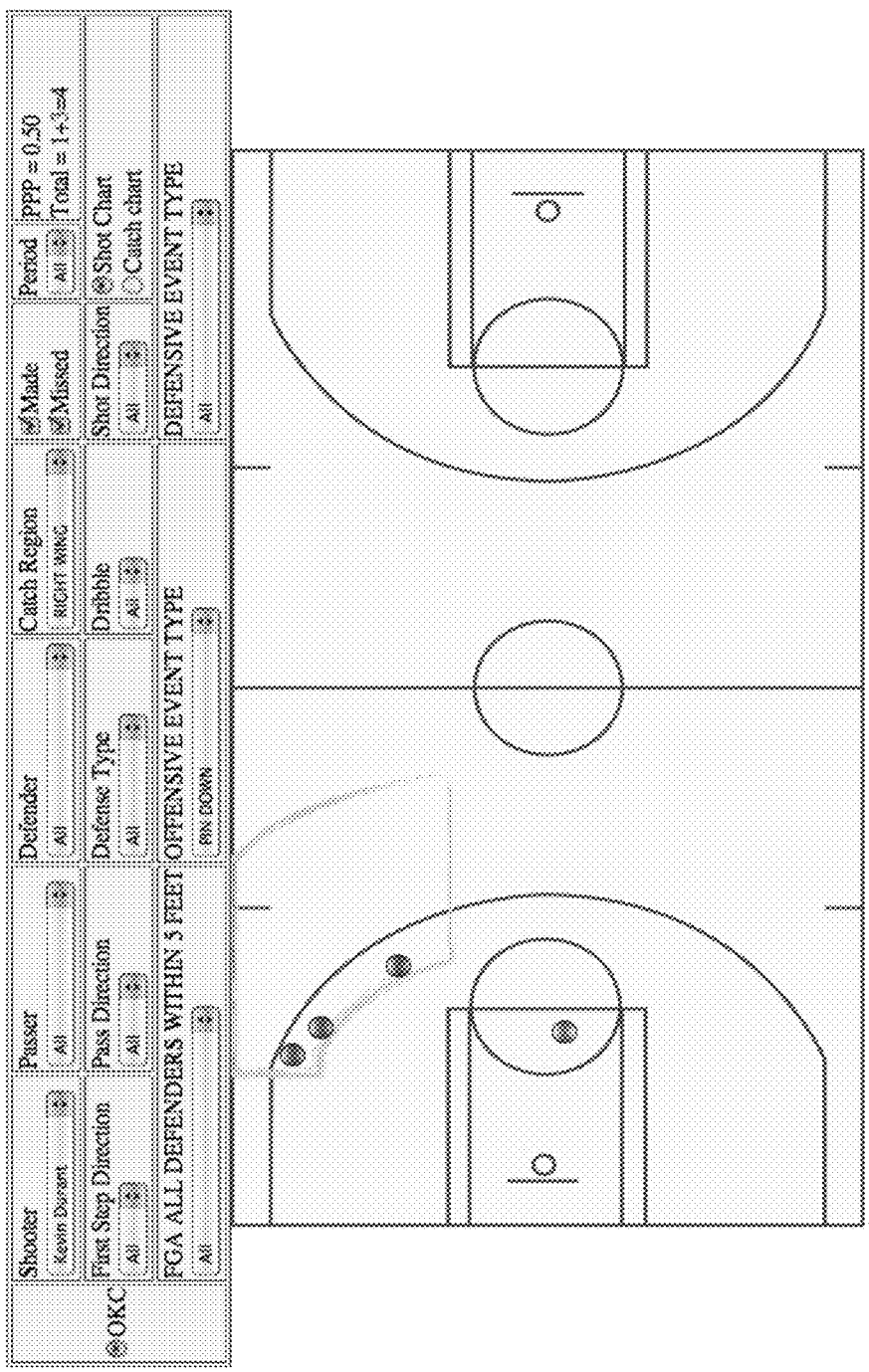
FIG. 9 is an illustration of an interactive user application/interface according to one embodiment of the invention.

FIG. 9. The analytics provided in FIG. 9 further demonstrate the enhanced potential of this technology resulting from the highly robust event profile dataset. In this scenario, which is similar to that depicted in FIG. 8, the user further filters the dataset by selecting a specific "catch region", thereby only seeing those possessions where the player caught the ball in the right wing section of the basketball court. The ability to generate, store and display data in this format as data is collected over the course of a season can provide the user with very powerful data related to assessing player performance and scouting.

The quantitative nature of the event profile dataset and interactive platform enables the user to filter based on specific metrics. For example, in the scenario depicted in FIGS. 8 and 9, rather than be confined by the "right wing" region defined by the system, the user could specify the range of distances from the basket that is of interest, essentially redefining the "right wing" region for the system. Such user-defined criteria enable the user to conduct its own data mining by event description and/or quantitative characteristics, thereby further customizing the presented output.

Figure 10:
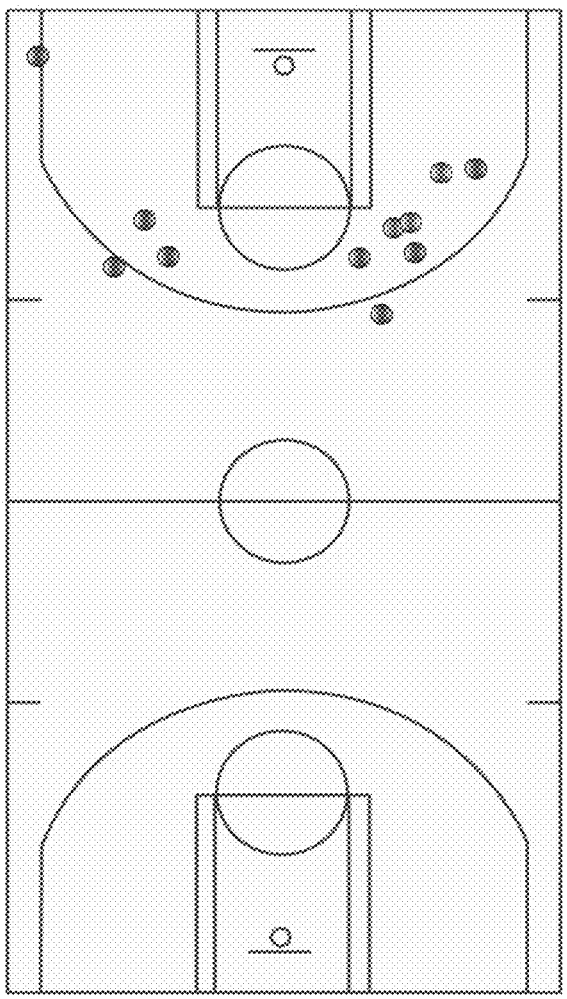
FIG. 10 is an illustration of an interactive user application/interface according to one embodiment of the invention.
Figure 11:
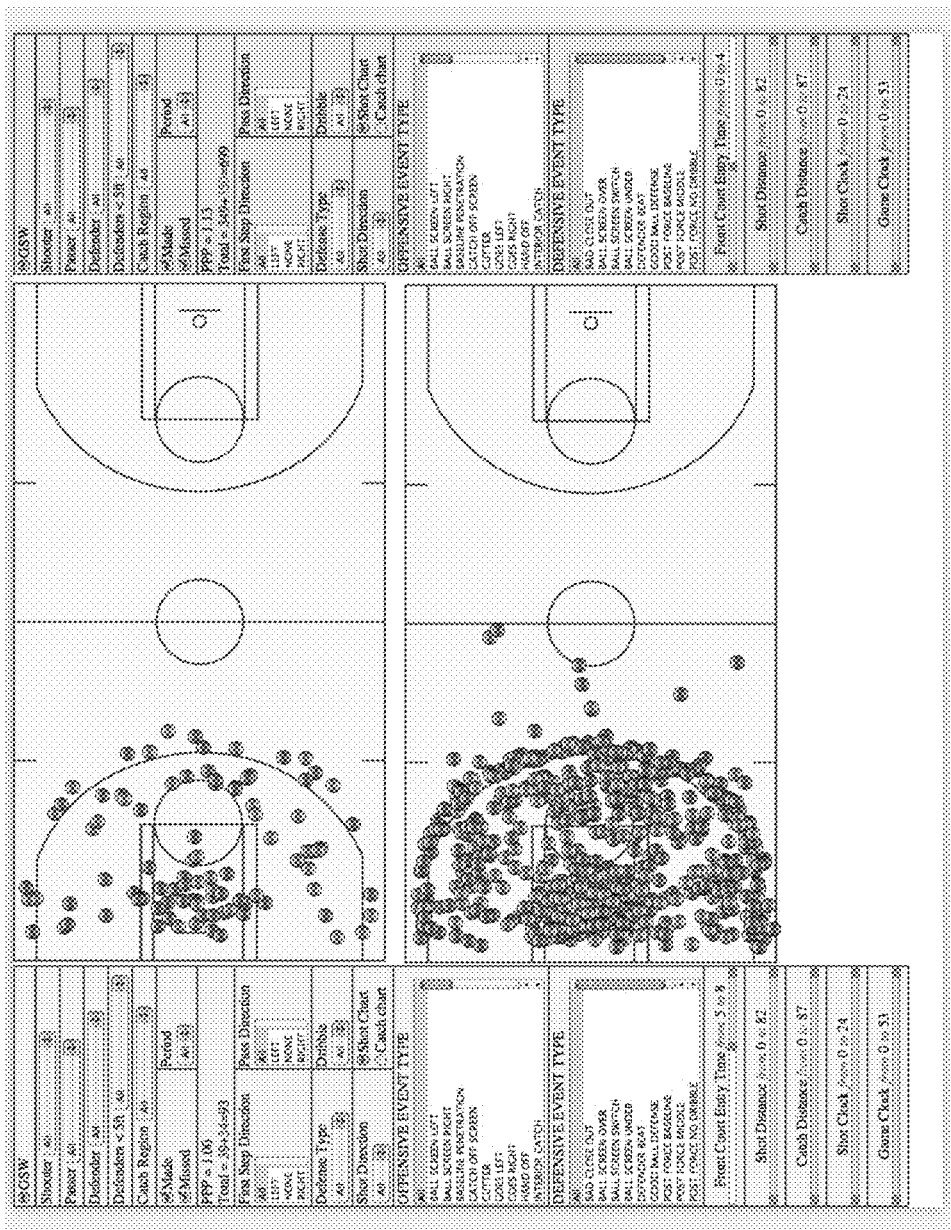
FIG. 11 is an illustration of an interactive user application/interface according to one embodiment of the invention.

FIG. 10 and FIG. 11. In another embodiment, the interface can be equipped with sliding scales corresponding to certain quantitative metrics to enable the user to select the specific values or ranges of values of interest to the user. For example, FIG. 10 provides an interactive analytics user application similar to those previously presented having many user selectable fields. Additionally, the application in FIG. 10 also provides several quantitative parameters that are user-adjustable using a slide bar tool. This feature enables the user to focus on outcomes of specific interest to the user (e.g., which play types resulted in the most shot attempts just prior to shot clock expiration). FIG. 11 illustrates an alternative interface configuration compared to that presented in FIG. 10.

Additionally or alternatively, the system can allow the user to further define certain criteria by allowing the user to input the characteristics of desirable/undesirable outcomes. Specifying for the system which types of events are "good" or "bad", will allow the system to track these events and provide detail on the sequence of events that lead to these outcomes. For example, the user may define a good defensive outcome for a team that is defending a high screen involving a highly-productive player (e.g., Lebron James) as one where the player either passes out of the screen (i.e., gives up possession of the ball) or takes a perimeter shot attempt. This type of customization enables the user to quickly and automatically identify plays of specific interest to the user.

Intelligent Analytics

As described above, the system and processes described herein enable the user to obtain analytical output that is customized to the user's specific interests. For example, for a team that runs a particular style of offense that consistently runs a particular play, this data would help identify those players who and situations which (e.g., defensive arrangement) result in the most successful execution of that play. Additionally, this data could also help in scouting players by identifying those in the league who may be best suited to run this particular offense. Moreover, this data would also be quite valuable in determine which teams/players are most susceptible to particular offensive and defensive schemes.

Figure 12:
FIG. 12 is an illustration of an illustration of an interactive user application/interface according to one embodiment of the invention.

FIG. 12. As events and outcomes of interest are better defined for the system, the strengths, weaknesses and tendencies of a team/player can be more readily discerned. For example, the system can continue to track events and outcomes of interest and identify those which result in a statistically significant or unusual benefit or detriment. By correlating event profile data with events/outcomes of interest, it is possible to identify which teams/players contribute meaningfully to desirable/undesirable outcomes. Accordingly, player/team strengths, weaknesses and/or tendencies can be determined from the available data. FIG. 12 provides an exemplary view of an interface that makes such information accessible to the user.

As described previously, training or adaptable algorithms can be used to proactively identify events or sequences of events that result in particularly desirable outcomes and then automatically define those identified events as notable plays and/or strengths. This enables the system without additional user input to "intelligently" recognize formations that were not part of the original programming. The use of such algorithms can greatly enhance the output of the system and, accordingly, its overall value.

For a team seeking to build around a particular star player, a deeper understanding of the player's strengths, weaknesses and tendencies can be of great value. As data is collected on the team's performance over the course of a single season or multiple seasons and desirable/undesirable outcomes are correlated with particular plays, formations, lineups and matchups, the player's strengths and weaknesses will be apparent. The system will also be able to recognize consistent patterns in the player's actions and decisions, which will reveal certain tendencies of the player. This information will enable the team to develop and execute a strategy that complements and accentuates the player's strengths while avoiding or deemphasizing the player's weaknesses.

Since the system itself may be able to automatically determine strengths, weaknesses and tendencies through correlating event profile data with outcomes of interest and identifying patterns of activity, the system may also be able to automatically identify strategies that can be employed. For example, if the system during a game identifies a sequence of plays that result in an uncommonly high percentage of scoring events, the system can identify aspects of those plays as strengths and recommend calling additional such plays later in the game or during a subsequent game. Such recommended strategies could provide considerable value since coaches rarely have such efficient access to such analytics and, accordingly, often base their play calling on a qualitative hunch. Moreover, this strategy recommendation feature could add significant value to sports media as broadcasters would have automated analytics that could be discussed during or after the game. For example, the system could generate a "Keys to the Game" output that captures the most important recommended strategies.

In addition to providing recommended strategies, the system can be configured to provide recommended personnel moves. By determining the team's strengths, weaknesses and tendencies and those the team's players, the system can automatically identify specific needs of the team and determine the personnel moves that need to be made to address these needs. Moreover, the system can also automatically identify and recommend particular players to acquire (via draft, free agency or trade) based on how the strengths, weaknesses and/or tendencies of those players match the team's needs.

Beyond simply providing valuable content that may enhance team strategy and improve sports broadcasts, the ability of the system to correlate events with outcomes has tremendous predictive potential. With large enough historical data sets and/or robust data on strengths, weaknesses and tendencies, the system can be configured to predict outcomes of games and even margin of victory. Moreover, since data can be collected and analyzed during a game, the system would be able to update win/loss probabilities with changing gamestates. For example, if a star basketball player for a favored team picks up three fouls in the first quarter of a game, the system can update its prediction to favor the other team. This feature may have profound implications for the gambling industry as it may enable a higher order of gambling, particularly wagering in game. Since this analysis is algorithm based and, consequently, highly automated, it will have the consistency and reliability necessary to earn the industry's confidence.

Another application based on the enhanced analytics generated by this system is simulations. With robust data corresponding to player and team strengths, weaknesses and tendencies a team could run simulations of particular plays, formations and lineups against future opponents to determine the best strategy for beating that opponent. These simulations can be run within the system itself with the user receiving output data (e.g., statistical performance) and/or recommendations (e.g., "offensive formation A is better suited for this opponent since it resulted in X % greater points per possession than offensive formation C). The systems can also be displayed in 2D or 3D form (e.g., gamecast format) to provide the user additional visual perspective.

Simulations can also be used to determine whether a particular player can be a good fit within a particular team's strategy and playing schemes. As mentioned above, the system can be configured to automatically determine a team's needs and then identify players who have attributes that address those needs for acquisition. Simulations can be used to further demonstrate the anticipated fit of a particular player. For example, the team has masses of analytical data on its team running particular plays and offensive/defensive sets. A simulation could be run by substituting a player on the team with one having the attributes of the prospective acquisition. This type of data may significantly de-risk the acquisition decision and make it easier to justify to management.

In addition to running simulations for strategy development, game preparation and player scouting, simulations can be executed for pure entertainment purposes. For example, fans constantly compare players and teams from different times and eras. This technology would enable the user to run simulated games against teams that never played each other (e.g., 1987 LA Lakers vs. 1996 Chicago Bulls) or matchups of some of the greatest players ever (e.g., Shaquille O'Neal vs. Bill Russell). This database containing event profile data of specific players could enable the user to assemble dream teams and run simulations to address all sorts of interesting questions (e.g., what if Lebron James and Kobe Bryant were on the same team?). Moreover, this event profile data could be used to create more realistic video games for depicting these teams and players. To that end, the system may include a data output specific for use with video gaming technology.

Fan Viewing Application

Figure 13:
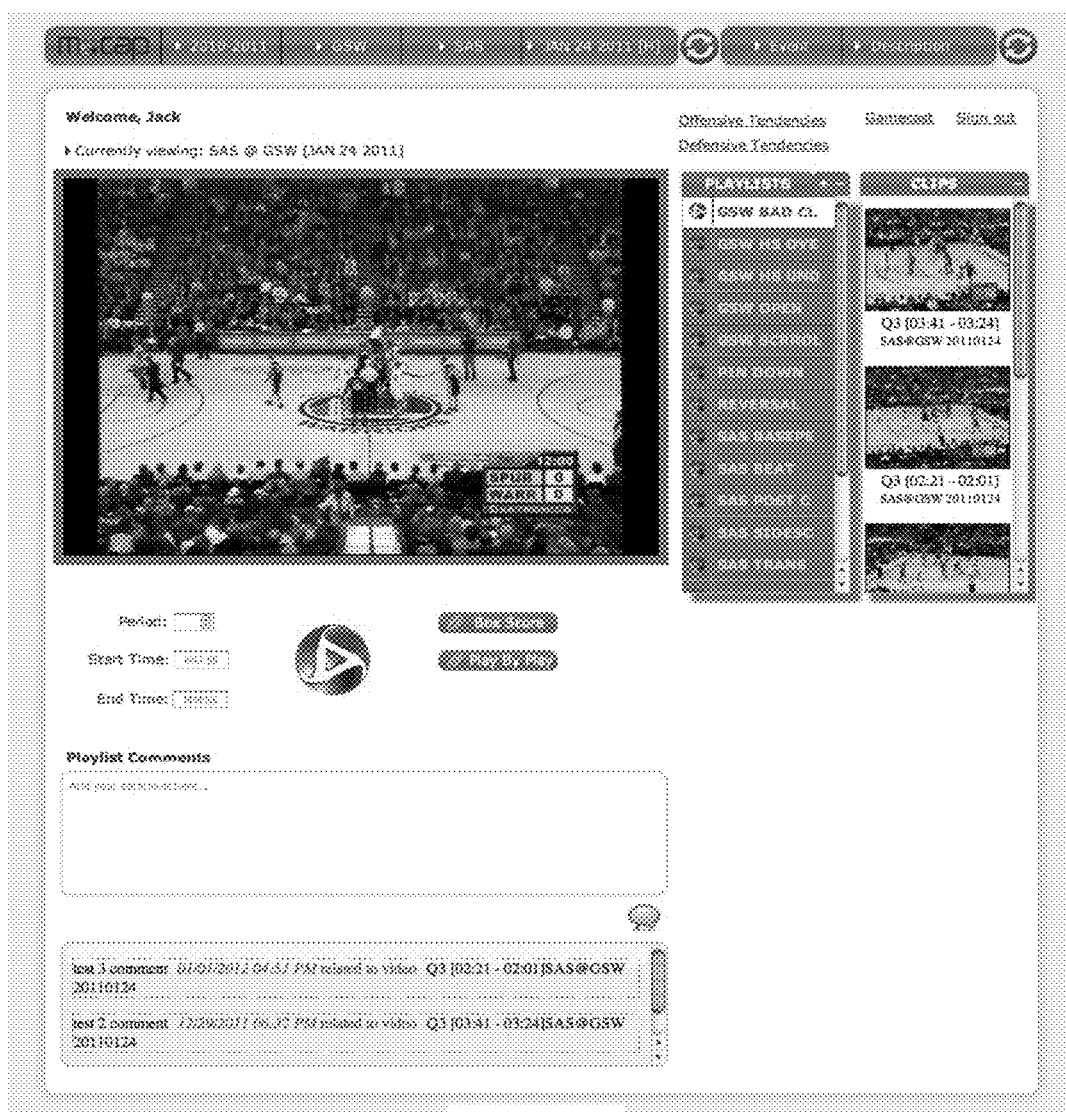
FIG. 13 is an illustration of an exemplary viewing application according to one embodiment of the invention.

FIG. 13. As described above, the comprehensive dataset accessible and available from the technology described herein enables unique 2D and 3D reenactments of sporting activities. The pairing of this data with video media corresponding to the sports activity also enables new ways to make this content available to different viewers and markets. FIG. 13 depicts an exemplary viewing application.

The fan viewing application can be run locally on a CPU or on a mobile application for a mobile device. Alternatively, it can be accessed remotely over the Internet. Regardless, the application can include a graphical interface that enables the viewer/user to adjust the display and presentation of data. For example, the viewer can specify the graphical images used for the objects on the player surface (e.g., icons) and adjust to the spatial and temporal regions of interest. The viewer can select dynamic criteria to detect activities of interest (e.g., team activities, player matchups, individual performance characteristics, etc.) and specify the game states of interest for display (e.g., players on team, players on/off court, opponent attributes, venue, time, score differential, etc.).

In one embodiment of the fan viewing application described herein, analytics data corresponding to a particular event, series of events or activity can be made available to fans via the Internet in a fan viewing application. The display of this data could be a gamecast for a particular game and also include the corresponding video media. This data can be manipulated and/or filtered to target or suit a particular audience. For example, this content can be customized to appeal to new or emerging geographic markets. In the case of China, data corresponding to players of increasing interest to the Chinese market (e.g., Yao Ming, Kobe Bryant, etc.) can be filtered and made available to fans in China. This data could be play-by-play, performance statistics or video highlights. Additionally, this data can be modified to be more personalized to the market. For example, textual or audio information in local languages/dialects could be incorporated into the application. Moreover, the application could also include targeted advertising that is congruent with the targeted content.

In another embodiment, the data could be presented to the viewer as a summary of all of the most notable events in a particular sporting activity. For example, select scoring plays or sequences, key defensive plays (e.g., blocked shots, steals, etc.), decisive moments (e.g., lead changes, etc.), pressure situations (e.g., last few seconds of quarter/shot clock, full court press, etc.) can be made accessible to and filtered by the viewer. This information can be presented as play-by-play textual data or as an audio/video highlight reel. The viewer can specify the type and presentation of the data by selecting certain fields in the application, which will apply the appropriate filters. For example, the viewer may only be interested in offensive possessions of a particular team or player or on a particular part of the court (e.g., in the paint) and can make selections in the application based on these preferences.

In still another embodiment, the viewing application is coupled to or integrated with a social media utility. The social media utility (e.g., Facebook) would enable access to the application within its social environment. The user would not only have access to event profile data for specific sporting activities, events, teams, venues and players and associated audio/video media, but would also have the ability to share this information with other users in the virtual social environment. For example, a user who is a loyal follower of the LA Lakers could use this viewing application to track the team's performance and share remarkable events or information with other Laker followers within the virtual environment. Having access to this content within the virtual environment not only would allow fans to share all types of information originating from the event profile data (e.g., performance statistics, video clips of key plays, etc.), but also provide a valuable forum to discuss this information. This can create valuable marketing opportunities for the social media utility, sports media and the teams themselves.

In another embodiment using social media, the application may enable selection of a particular player to follow (e.g., favorite player, player on fantasy team, etc.). The social media utility can send the user automated notifications when the selected player makes a remarkable play. The remarkable play would be based on quantitative and/or qualitative measures that are automatically registered as event profile data by the event recognition algorithms. The remarkable play can be pre-defined (e.g., offensive plays from scrimmage of 15 yards or greater, fast breaks ending in a slam dunk, blocked shots, home runs greater than 400 feet, strikeouts, pitches in excess of 95 miles per hour, etc.) or pre-selected (i.e., selected from a menu of event profile data of interest) by the user. Optionally, the automated notification to the user can include a link to video media associated with the remarkable play. In a related embodiment, the user can utilize this application to track statistical performance of players on the user's fantasy team. For example, the user can specify in the system to track all events resulting in points to the user's fantasy team and login to the application to access additional information about the tracked events, including linked video footage.

Another aspect of the viewing application described herein is its accessibility via mobile devices. Gamecasts, including related audio and video media, could be wirelessly streamed to most mobile devices (e.g., smart phones, tablets, laptop computers, etc.) so that the user can have access to content while on the move. This would enable fans to follow their teams and players even when engaged with a conflicting appointment or otherwise unable to access a television. This mobile access can be particularly valuable even when a television is available because many sporting events are not broadcast on television, or television broadcasts are limited to select markets. As will be discussed in greater detail later, mobile access also enables a high degree of convenience and efficiency in coaching, player education and training.

For those fans who are attending the sporting activity/event itself, mobile access to this data can enhance the entire experience. For example, the data available on the mobile device can give the viewer information that isn't readily available in the arena (e.g., player statistics). This information (e.g., textual play-by-play) can also help the viewer better follow the game, particularly when the viewer may have missed some of the game while standing in the concessions line. Additionally, access to event video media via the viewing application would enable the viewer to replay the more remarkable moments during the sports event.

Video Archiving

As mentioned above, event profile data corresponding to particular events during a sporting activity can be linked to video media corresponding to those events. This feature has profound implications as it enables a user to access video footage for any event captured in the event profile data of a particular sporting activity/event. Moreover, since the event profile data can be linked to video media, the video media can be searchable according to any of the stored event profile data. The coupling of the event profile data to associated video media effectively creates a fully searchable library of archived video media. Users will have the ability to run searches based on all type of event profile data (e.g., players, plays, outcomes, times, etc.) and access and view video clips that are responsive to the user's queries. What would take many man hours to compile can now, with this technology, be automatically compiled and accessible within minutes. There are several important applications of this utility.

In one embodiment, a coach or player can run a query to generate a video playlist of events of interest (e.g., matchups, good/bad outcomes, etc.) and review the video footage with the team during practice. Alternatively, the coach can provide playlists to players as homework to review prior to the next game or practice. For example, the technology described herein can within moments of a game's completion generate a playlist of desired video clips from the game from a database of event profile data linked to the video footage of that game. This playlist can be loaded on a mobile device (e.g., iPad) and provided to the player before the player leaves the locker room so the player can review the video before practice the next day.

In another embodiment, a searchable library of video footage can provide tremendous convenience and efficiency for broadcast media who typically search for specific video material using laborious manual techniques. For example, sports broadcasters would be able to immediately search for and access footage for use as replays and highlights during a particular game. For those preparing a sports news program, particularly after a busy day full games, a searchable library of the day's events would provide considerable value and competitive advantage. Moreover, given the recent popularity of sports video documentaries, which pull together video footage from many different sources, a searchable archived of historical media would reduce production costs considerably.

In still another embodiment, as already mentioned above, access to a searchable video archive can create new virtual forums and communities for viewing, discussing and sharing sports-related content. For example, a fan of a particular player (e.g., Lebron James) could search for and generate a playlist of his favorite moments in the player's career and then make this playlist available on his social networking page. The playlist could include screen capture images of the particular moments as well as a link to access the moments. Additionally, visitors to the fan's social networking page can post comments to compliment or criticize the fan's choices. Visitors may even post links to other video clips to provoke additional discussion/debate. The accessibility of video media will not only facilitate activity and engagement among sports fans within these social networking environments, but also intensify that engagement because of the passion that many fans have for sports and the unique ability that the video footage has to express a sentiment.

Performance Analytics

The spatial and temporal object coordinate data that is obtained, analyzed and stored by the technology described herein and the resulting event profile data can also be used to better assess player/athlete performance, ability and conditioning/fitness. The object coordinate data from actual games, practices or drills can be analyzed and coupled to secondary source data pertaining to the player/athlete (e.g., size, weight, etc.) and venue (weather, playing surface, etc.) to generate kinematic data such as velocity, acceleration, distance, impact force, etc. This kinematic data could be used to compare or rank players such as at a scouting combine. Additionally or alternatively, this data could be used to assess a player's performance over time by comparing the data from an earlier event with that from a later event (e.g., running a play in game 1 compared to running the same play in game 20). This data could also be used to assess a player's conditioning/fitness or determine the player's success in recovering from injury. This data could also be used to identify episodes of fatigue that could be the precursor to injury.

Fantasy Gaming

Another application for the technology described herein is analyzing the object tracking coordinate data to identify and generate new statistical measures for performance for use and adoption by the fantasy sports industry. This technology is particularly suited to analyze the coordinate data to develop performance metrics for defense, which are very few in number but in high demand in fantasy sports. For example, the coordinate data can be analyzed to determine in a basketball game how close a particular defender was to a shooter at the time when a shot was taken. This data can be used to create a points per possession allowed metric for defenders. Since these types of metrics can be generated automatically, objectively and reliably, they can add a new dimension to fantasy sports gaming.

Referee Analytics

Since the object tracking coordinate data collected by the system can also track the movement of referees, officials, umpires, etc., this technology can be used as a tool to assess and evaluate the performance of referees. For example, referees' positioning and movement vis-à-vis the ball and players on the court can be tracked with this technology. With this data it can be easily determined whether a referee was in the correct position during a controversial call. Additional analytics such as tendencies can be determined using this data. Moreover, the kinematic data described above can also be used to determine the performance and conditioning/fitness of referees. For example, the data could be used to correlate declining performance with declining physical fitness.

Optical Tracking System Diagnostic

As described above, one valuable component of the software technology described herein is error analysis to identify and mitigate errors and discrepancies in the object tracking coordinate data. Similar processes can also be used to assess the quality of the object tracking technology and the usability of the data produced therefrom. For example, the system typically identifies an error, analyzes the error to determine the source, logs the error, applies conflict resolution algorithms to resolve the error and logs the resolution. With large sets of object tracking data, many errors are identified and resolutions logged. This error data can provide valuable diagnostic information about the performance and reliability of an object tracking system.

In one embodiment, the error and resolution logs can be used to assess and compare the reliability of various data acquisition methods and modalities. For example, if one object tracking technology experiences occlusion artifacts (i.e., missing ball coordinates) in 15% of its acquired data while another tracking technology sees occlusion artifacts in 33% of its data, the diagnostic software can conclude that the former tracking system is more reliable than the latter.

In another embodiment, it may be beneficial to provide diagnostic error analysis to incoming coordinate data as a quality check for the object tracking technology. Once a large set of error data has been recorded and analyzed by the error analysis software, the system will be able to set threshold error rates to confirm proper functioning and calibration of the object tracking system. The software will also be able to identify patterns or inconsistencies in the incoming data and provide diagnostic error messages to troubleshoot and problem solve potential malfunctions in the object tracking system.

Many of the examples described herein are with respect to the sport of basketball. However, such examples are provided for the sake of illustration only and it should be understood that many of the concepts and embodiments presented herein are readily applicable to other sports such as football, baseball, soccer, hockey, tennis, golf, lacrosse, etc. Moreover, it should be understood that the embodiments disclosed herein can be configured to be implemented in software and utilized by via any number of computing devices (e.g., personal computer, mobile device, etc.) having a user interface. Accordingly, these aspects (e.g., software, computing device, user interface, etc.) can, either alone or in combination, be elements of any of the embodiments described herein.

In one embodiment, the present technology is directed to receiving a continuous feed input, such as, for example, an output from a camera or a tracking device. In this embodiment, the output may be converted to a mathematical description, such as, for example continuous coordinate data for one or more of the real world items, such as for example, players or balls, tracked by the camera or tracking device. In one embodiment, the technology uses algorithms specifically adapted for the type of continuous data being received to generate one or more subsets of the continuous data, the subset being descriptive of particular parameters which are useful to a user.

In one embodiment, an input video feed is converted through a number of steps into usable data descriptive of player effectiveness, which data is accessible by a user. In a first step, the present technology is directed to receiving a video feed of, for example, a basketball game. In a second step, the present technology is directed to converting the video feed into, for example, a continuous coordinate data stream representing for, for example, the positions of the players and the ball during the game. In a third step, the present technology is directed to applying a predefined algorithm to the continuous data stream to calculate, for example, the offensive and/or defensive effectiveness of a particular player during the game. In a fourth step, the present technology is directed to taking the output of the preselected predefined algorithm and storing that output in an output table which is accessible by a user either remotely or locally. In an alternative fourth step, the present technology is directed to taking the output of the predefined algorithm and transmitting that output to users in a real time environment, such as, for example, a social media outlet, such as, for example Twitter. In a further alternative fourth step, the present technology is directed to taking the output of a predefined algorithm and combining that output with a real time depiction of the event that generated the original video feed, such as, for example, a basketball game and transmitted to a user in real time or stored for later access.

The essence of the present technology is taking spatial and temporal coordinate data recorded from any object tracking system or method, formulating mathematical equations to identify situations, interactions, or events that might have occurred during the recordings, applying these mathematical equations in the form of automated event recognition algorithms to process the object tracking data in order to confirm whether or not the events occurred during a specified sequence, storing the subsequent findings in a scalable and accessible manner, outputting it using various user interfaces, and allowing a viewer to interact with the information through a variety of media platforms.

In order to add meaning to object tracking data in the form of spatial and temporal coordinates, recognizable events contained within the tracking data must be identified. In one embodiment, the present event recognition algorithms take positional and kinematic data generated during otherwise undefined or unidentified sequences in a game, such as, for example, the coordinates of the players, ball, and referees during 24 seconds of game play, and transform that data into usable outputs such as, for example, output tables containing times and names of identified events. In one embodiment, the input data is filtered to identify the smallest set of data containing all the necessary information used by the event recognition algorithms to identify a particular situation. Those filtered parameters may then be included in an output table which allows a user to access the event-related information. Alternatively, or in addition, those filtered parameters may be used to generate real time data visualization for users following on remote devices. As one example, the data in an output may be used to identify what play a team ran during a particular sequence.

In one embodiment, the present technology may be used to, for example, to analyze a stream of input data and recognize that: (i) the stream represents a basketball game; (ii) a particular team is on defense; and (iii) that the defensive team is employing a particular defensive scheme. Once the particular situation and defensive scheme is identified, the present technology may use an algorithm that is defined for that situation to compare the actual actions of the players to a predicted set of actions for that situation and create an output that records whether or not the situation has occurred, and with an indication of how effective the players were compared to what should have happened. In one embodiment, the present technology may utilize a library of algorithms, each algorithm defining a particular situation or set of situations, and selecting the most applicable algorithm for a particular set of input data, disregarding those algorithms which do not apply. In one embodiment, the most applicable algorithm may be selected by the user to provide particular data or to carve out special cases from all the available input data. In one embodiment, the present technology may be used to capture all possible data related to a particular situation then carve out special cases which may be of interest to a user. In one embodiment, the present technology may be used to filter a large number of conditions indicative of a particular situation, use algorithms to remove extraneous data and output the remaining data which may be accessed by a user. In one embodiment, the present technology, where the technology is unable to identify an applicable algorithm, the failure may be used to indicate that a particular situation has not yet been characterized and a developer notified to initiate the development of appropriate algorithms for use with that situation.

In one embodiment of the present technology, the data in the output table may be used to develop a customized output for a particular team or coach, where, for example, that team or coach has requested an output keyed to a particular situation, game times, preferred naming conventions or other criteria of specific interest to that team or coach. In one embodiment of the present technology, the data made available to the user may be specifically customized for the needs of that user.

In the initial processing of raw input data, the present technology may encounter missing or incomplete data due to limitations of each object tracking system, method, or operator, for example, tracking data acquired using visible light may be missing key data, such as, ball position, due to inherent technical limitations such as occlusion. In one embodiment of the present technology, the input data is scanned to identify missing coordinate data of, for example, a basketball, using error detection algorithms. In one embodiment of the present technology, gaps in, for example, coordinate data, may be accounted for using data bridging algorithms to fill in the missing data.

In one embodiment of the present technology, a mass of input data, such as, for example, tracking data acquired through recordings from multiple cameras arranged around an arena during a basketball game, may be modified to reduce the input data to a meaningful output by, for example, pre-identifying situations which would be of interest to a user and selectively filtering the input data to store only the data which would be of interest in analyzing the pre-identified situation or situations of particular interest to the user. In one embodiment of the present technology, the filtered data for a particular game is stored in a single output data file. In one embodiment of the present technology, the filtered data for a particular game is stored in multiple output data files where each output data file is applicable to a particular user or pre-identified situation.

In one embodiment of the present technology, a pre-defined output file (also known as an output table) is developed for each game where coordinate data is available. In one embodiment of the technology, the coordinate data is initially filtered by error recognition software and missing data replaced by data bridging algorithms. In one embodiment of the technology, event recognition algorithms are used to filter the input coordinate data and populate the output table using coordinate data selected by the event recognition algorithms. In one embodiment of the present technology, the output file is used to populate specific web applications.

In one embodiment of the present technology, the output file further includes or is linked to a narrative of the events of the game, such as, for example, play by play data. The resulting information can be used to create a more complete narrative or to supplement information provided during a radio or television broadcast, in real time on non-real time. In one embodiment of the present technology, the combined narrative and data output is made available to a user via, for example, social media such as Twitter. In one embodiment of the present technology, the output file may be used to generate, for example, real time e-mails describing the action and focusing the user on key data related to that action. In such an instance, the user can specify in advance the types of desired information or output and the system can subsequently automatically identify and forward the types of information most interesting to the user.

In one embodiment of the present technology, the inputs may be any of a number of sources that generate relevant tracking and/or coordinate data, such as, for example RF ID tagged players and balls.

In one embodiment of the present technology, a stream of raw data is transformed into useful output data in a table which can be queried by a user to obtain a detailed understanding of a particular situation, player action or other question of interest. In one embodiment of the present technology, the raw data is filtered to identify missing data and/or errors and fill in the missing data or correct the errors.

In one embodiment of the present technology, the input data is filtered through algorithms which reduce the data set by selectively outputting data which is relevant to pre-selected situations, times or other criteria of interest to the end user. In a further embodiment of the present technology, the filtered data is place in an output table, or stored in a database, which may be used to generate real time outputs for use in, for example, social media such as Twitter or for use at a later date by users who are able to query the output table.

Outputs

In one embodiment, the present technology may be used to provide a user with a range of uniquely customizable outputs, including the ability to isolate and manipulate specific objects or select sequences of game action. As an example, in one embodiment of the present technology, a user has the ability to isolate, remove, or uniquely display specific objects in the output. As a further example, in one embodiment of the present technology, the user has the ability to remove, for example, the referees in an optical video display of a basketball game. Conversely, in one embodiment of the present technology, the user has the ability to show only the actions of the referees.

User Controlled Platform for Automatic Distribution of Algorithmically Generated Content For each method of output to the user there is also a need for a scalable method of distributing that content from the user of the application to a broader audience, whether that be a group of friends or the fans of a particular organization. This platform will allow the user to select a subset of the total algorithmically generated content that they can then easily share through various channels (social media, traditional media, video, email, etc.). This platform will also allow for the generation of revenue based upon advertising in, on or around the algorithmically generated content available on the platform.

Transaction Platform

This platform combines the activity/event profile data with other secondary data sources, such as player salaries, player positions, player measurements, to allow decision makers on real and fantasy teams to (a) query and find the strengths and weaknesses of teams, (b) receive an algorithmically generated player recommendation(s) based on team and player profiles and desired strategy (c) communicate with necessary parties about transactional proposals, (d) output a model of expected team and player performance with and without execution of the proposed transaction.

Possession Tails—Player Trajectories.

Figure 14:
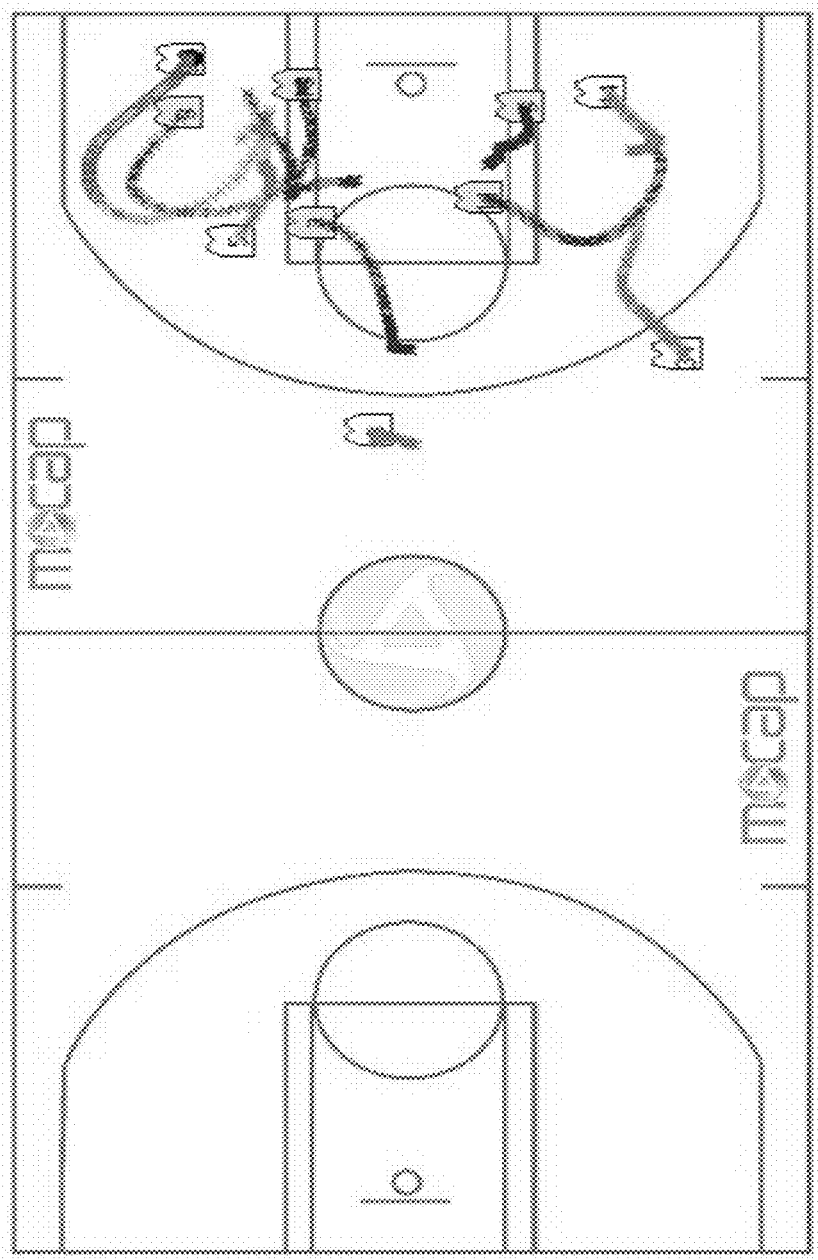
FIG. 14 is an illustration of a two-dimensional animation of a sporting event including possession tails according to one embodiment of the invention.

FIG. 14. In one embodiment of the present technology, the data in an output table may be used to generate possession tails and/or player trajectories. In one embodiment of the present technology may be used to generate, for example, still shots, animated frames, or other forms of complementary data, that deliver additional information to the user. In FIG. 14 below the trajectory of every basketball player is illustrated for, for example, a 3 second period, such as, for example, the final 3 seconds, during a game. In a further embodiment, these trajectories could be generated at key times that are automatically identified using pattern recognition algorithms, such as, for example, the last three seconds on a shot clock or the last three seconds of a fast break. In a further embodiment of the present technology, the image in FIG. 14 may be generated at, for example, the moment the ball is shot. In one embodiment of the present technology, an image could be made anytime a particular player performs a selected activity, such as, for example, sets a screen, drives right or plays zone defense. In a further embodiment of the present technology, the output could also be annotated such that different colors represent specific events. In one embodiment of the present technology, for example, the red tail at the top of the FIG. 14 may represent post-possession movement by the player who shot the basketball. Alternatively, color-coded markings, such as, for example, the colored tails in FIG. 14 may be used to illustrate other information, such as, for example how fast a player moved, or where a screen was set, or any other data that is identified or calculated using the present technology. In one embodiment of the present technology, the output illustrated is type of output is beneficial because it allows a user to quantify and review a very large range of information about what each player and, in some embodiments, even the referees are doing. In one embodiment, the user may call for this information from a wide range of electronic devices, including, for example, a screen app on an electronic tablet, such as, for example, an iPad.

In one embodiment, the output generated by the present technology may be, for example, Interior Penetration Maps for basketball, such as, for example, a radial histogram that shows the frequency of team possessions where the offense penetrated beyond some distance to the basket. In one embodiment, the map may be, for example, a color coded visualization tool that would allow the viewer to see that in a selected percentage of their team possessions. In one embodiment the output may allow a user to discern specific characteristics of a possession, such as, for example that Team A was able to get the ball within, for example, ten 10 feet of the hoop on, for example twenty percent of its offensive possessions. In a further embodiment, the output could include additional context that selects for a player, a type of play, such as, for example, post plays by Player B and may further include additional context, such as, for example, a particular side of the court and the type of play, such as, for example, an isolation play or a ball screen.

The uses of the present technology are useful for a large range of situations where a user is faced with a large flow of data describing an event or series of events, such as, for example a baseball game. In one embodiment, the output generated by the present technology may be used to analyze a baseball game and describe how hard each ball was hit by a particular player to see if this is, for example a predictor of future batting performance. Alternatively, for a pitcher, the output may generate data indicating that it is time take them out of the game. In one embodiment this metric would be independent of whether the batter was safe or out. In one embodiment, the algorithm used to generate the output may include characteristics of the ball after the batter makes contact.

In another embodiment, the output generated by the present technology could be measured against performance thresholds to determine whether a particular player, combination of players, lineup or an entire team are meeting particular thresholds for performance. For example, the performance thresholds could be kinematic (e.g., player speed, ball velocity, leaping elevations), physical fitness based (e.g., reduced performance in the 4th quarter) and/or teamwork focused (e.g., # of passes per possession). This information could help determine whether a particular player or team is functioning at an impaired or superior level relative to past performance or compared to peers.

Tools

The present technology may be used to provide a user with unique coaching tools, such as, for example, a coaching tool which allows a coach to show the team an offensive set their opponent runs using, for example a handheld monitor prior to or during a game. In one embodiment, the set might be shown as a static display of all players on the court and the coach might use that output to instruct the team on how to deny passes from Player 1 to player 2 and 3 and allow passes to players 4/5. In one embodiment, a touch-screen display, for example, would allow the user to tap each player shown in the starting offensive set and find the stats when the first pass from an offensive set goes to, for example, a particular player or region of the court. As an example, when Team A runs a wedge set and Player 1 and Player 2 are in the high post, the user would use the present technology to help the team understand that they score 0.95 points per possession when Player 1 gets the first pass and only 0.82 points per position when Player 2 gets the first pass. Therefore, when this offensive set is shown to the team, Player 1 might be highlighted in, for example, red, indicating that the team should deny Player 1. In another embodiment, a media outlet might use the same tool to educate and/or entertain its audience.

Comparative Analysis Tool

Figure 15:
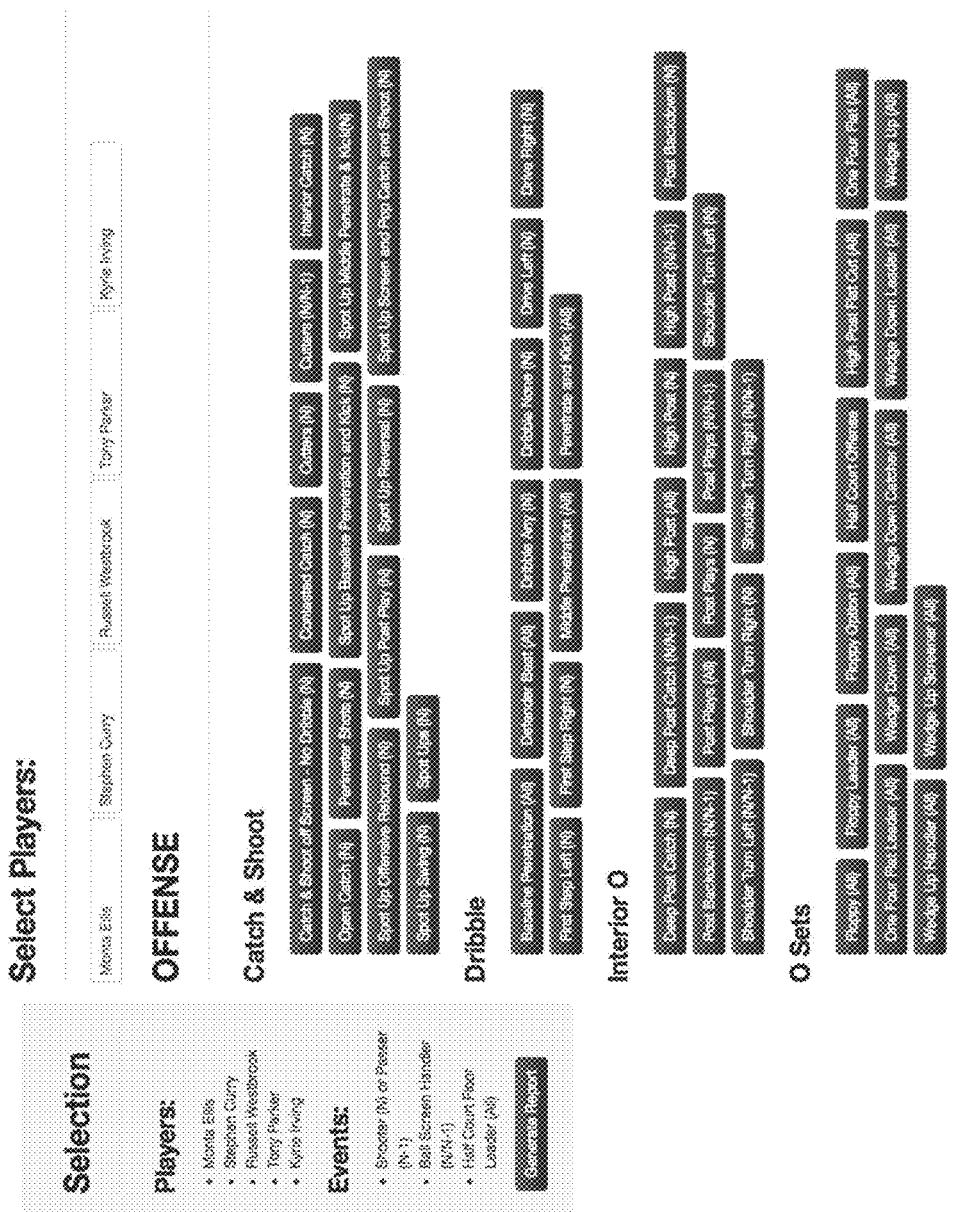
FIG. 15 is an illustration of an input screen for a comparative analysis tool according to one embodiment of the invention.
Figure 16:
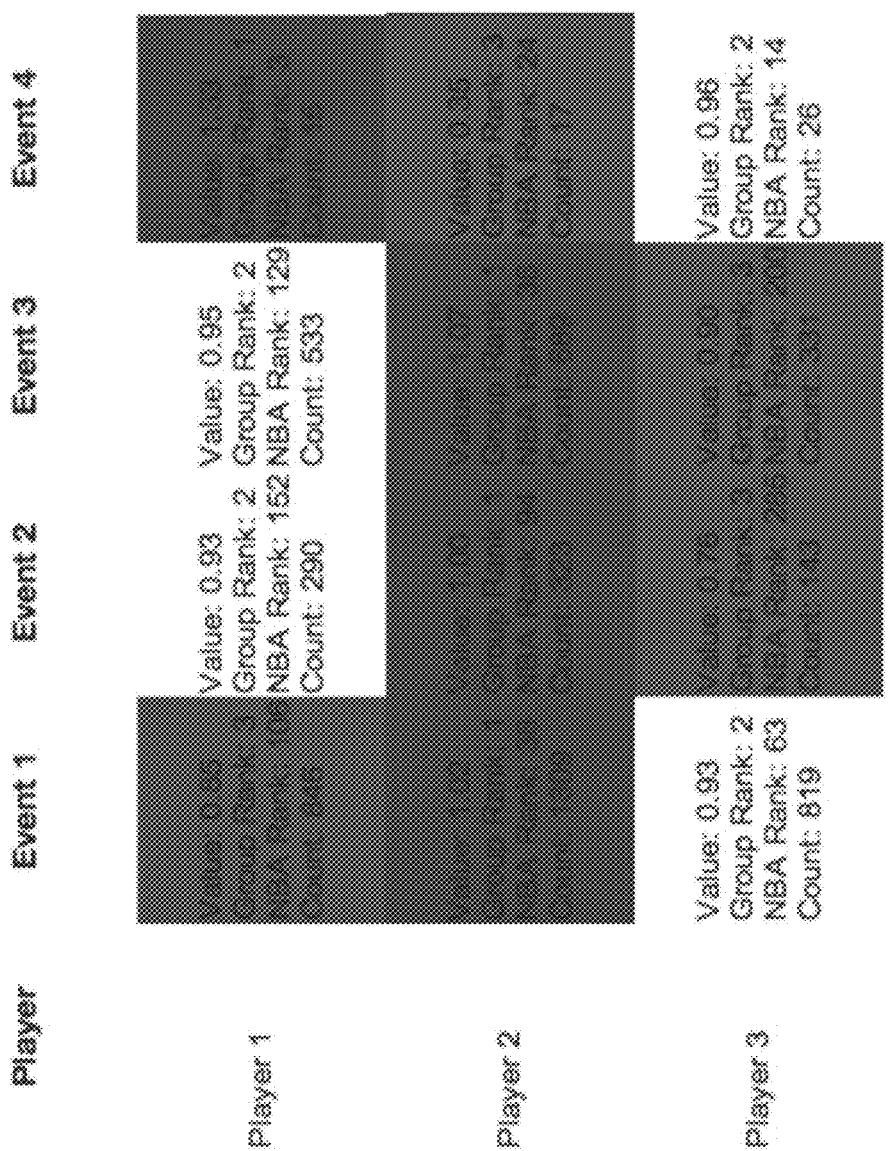
FIG. 16 is an illustration of an output screen for a comparative analysis tool according to one embodiment of the invention.

FIG. 15 and FIG. 16. In a further embodiment of the technology, the output generated by the present technology may be useful in a comparative analysis reporting tool. FIG. 15 is a screen shot of an input for such a comparative analysis reporting tool. In a further embodiment, raw data may be used to generate insight to a team's strengths and weaknesses and, using that data, a comparative analysis reporting tool using the present technology may allow a team to make personnel decisions based on very specific player attributes and team needs. In the embodiment illustrated in FIG. 15, a user may select multiple players along with their roles in various situations for a comparative evaluation. FIG. 16 is a screen shot of an output of a comparative analysis tool using the present technology.

In FIG. 16 the output of the comparative analysis tool is flexible and can combine some visual representation of the comparison along with an in-depth numerical assessment. In the embodiment shown, the effectiveness of selected players is displayed in each pre-specified situation and role, along with their NBA rank and rank within the group of interest. In the displayed embodiment, the rank within the group of interest here would be between 1 and 5 since there are 5 players selected to compare. In one embodiment, the final output could be a single recommendation of the "best fitting" player for a specific list of needs. In other embodiments, each of the component situations and roles could be ranked by importance, which would then adjust the computation for the final player recommendation offered by the tool.

In one embodiment using the comparative analysis tool described above, the present technology can be configured to automatically identify weaknesses, vulnerabilities and associated needs of a particular team in accordance with predetermined performance metrics. Based on this needs evaluation, the present technology can identify skill sets and/or attributes that would address the identified deficiencies and automatically identify the top players, or combinations of players, to fill these voids. The identified players might be acquired via trade, free agency or draft.

Similarity Tool

In further embodiments, the technology may be uses for, for example, a "similarity tool" which lets a team use certain conditions to compare a college or high school player to a more familiar player. In one embodiment, the user might select Player A along with 5 generic attributes, and the output would enable the user to compare using those attributes, and ranked by importance if desired, and select the most similar players, for example, considering 5 predetermined attributes, Player A is most like Players B and D.

Interactive Fantasy

According to one embodiment, the outputs may be used to create interactive fantasy games. For example, a baseball fantasy game where the user can act as manager during the game and control where the fielders are positioned prior to each pitch. In one example, a particular fielders may be positioned based on that fielder's range and, based upon a game generated probability distribution the user could use that positioning to determine the outcome of an at bat. Thus the user would be able to compare skills to actual calls made by a manager in a game.

In another embodiment, the outputs of the present technology can be used to create realistic simulations. For example, a simulated game could be created between two legendary teams that were separated by decades. In another example, hall of fame players of different eras could be matched against one another in a simulation to determine who would win.

Social Media

In one embodiment, the output generated by the present technology is transmitted to users in real time using social media such as, for example, twitter. In one embodiment, the output generated by the present technology is used to create live tweets of games and the content is sponsored, by, for example, teams or corporate sponsors. In a further embodiment of the technology, the output generated by the present technology is utilized by users to create secondary content for social media, such as, for example, to create blog content. In one embodiment, the output generated by the present technology is used to provide an automated email with an overview of the interesting points of a game. In a further embodiment, such an automated e-mail could be provided to bloggers, sports writers and/or fans on a subscription basis. In one embodiment, the output generated by the present technology may be used to provide content for a live version of a game using video graphics to stream to users. In a further embodiment, the output generated may be used by teams and players to add value to the franchise and the players, by, for example, giving the players access to a profile with information and graphics that allow them to more clearly define themselves and increase the their brand awareness.

In another embodiment, the social media content described above can be shared in an interactive social media environment (e.g., Facebook). Users who subscribed to receive content about a particular team or player can share this content with other users to initiate or facilitate dialog.

Second Screen Apps

In certain circumstances, it might be beneficial to provide statistical, graphical, analytical information related to a particular sporting activity or event via an auxiliary resource such as a "second screen" app. Having such an app as a resource can greatly enhance the viewing experience of a viewer watching the sporting activity or event on television or in person. In one embodiment such a second screen app may include the output of the present technology. In another embodiment, the output of the present technology available on such second screen app may be paired with certain sponsorships or promotional advertising.

In one embodiment, the output generated by the present technology may be available via at least a first and a second account. The first account may, for example, allow the user to access a customized automated stream of tweets about actual events in sports in conjunction with content generated by the present technology. The second account may, for example, allow a user to access pictures and visualizations of actual sporting events in conjunction with or modified by content generated by the present technology.

In one embodiment, the output generated by the present technology may be used to populate a ticker, such as, for example, the tickers which appear at the bottom of a television screen during sporting events.

Web Applications—Spray Chart

Figure 17:
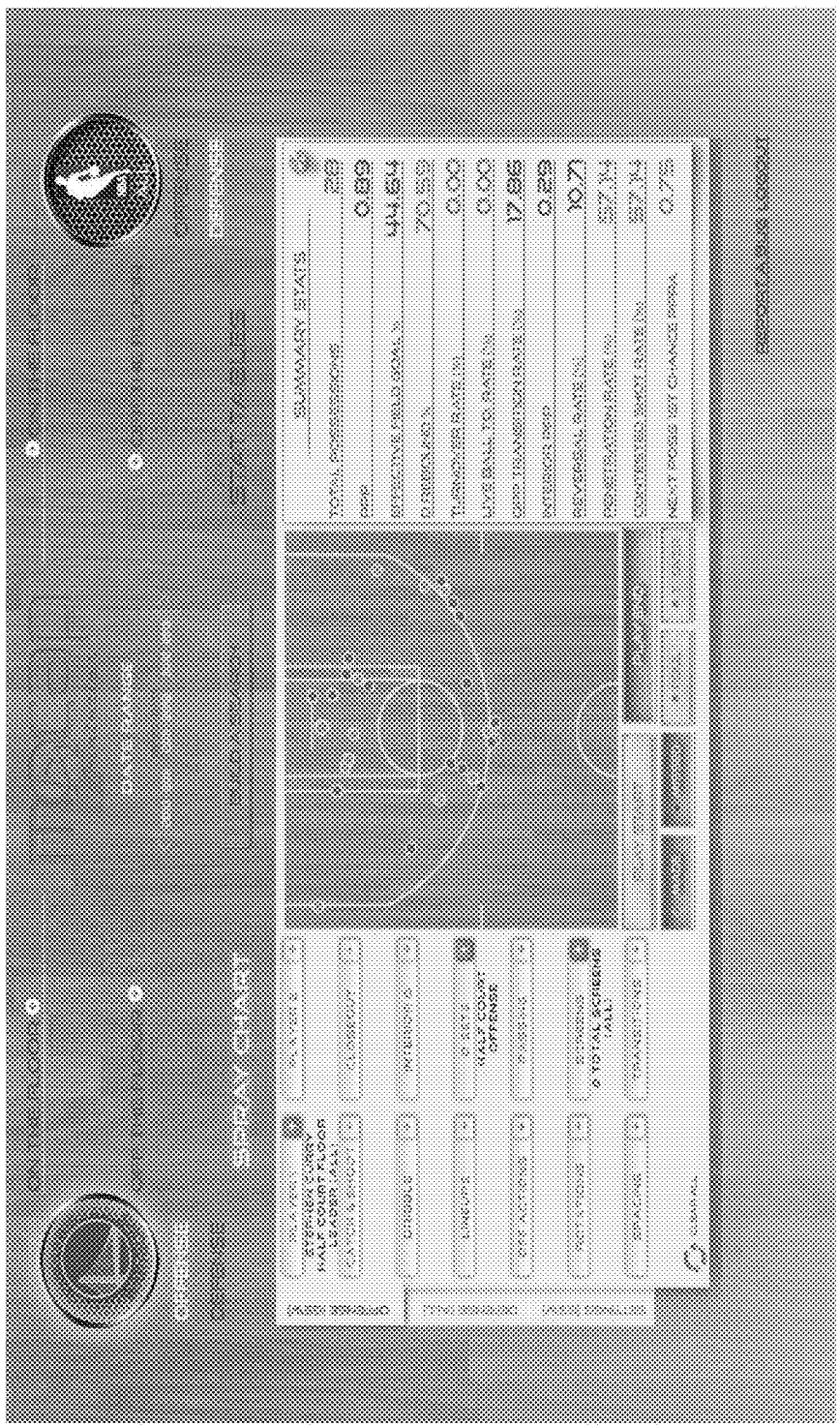
FIG. 17 is an illustration of a web application according to one embodiment of the invention.

FIG. 17. In one embodiment, the output of the present technology may be used in a web application (or interactive online application). FIG. 17 illustrates one example of a web application used by a team to interact with output data created using the present technology. In one embodiment, FIG. 17 may be a "spray chart" which allows the user to select any combination of available filters to find the specific insights. In one embodiment, filters may be, for example, set in "player 1", "o sets", "screens" on left side of page and combined with offense, defense and game settings. The user can then view the location of the start or end of the final play of the possession (the final play of a possession may be defined as the play that ends in a made shot, missed shot, shooting foul, or turnover). In this embodiment, the right side of the panel would then provide an overview of the stats related to the filters that have been set. In this embodiment, numbers shown in red are below the league average for the specified situation, and numbers shown in green are above the league average for the specified situation. In other embodiments, the user may also select specific players on or off the court at the top of the page.

Web Applications—Stat Tables

Figure 18:
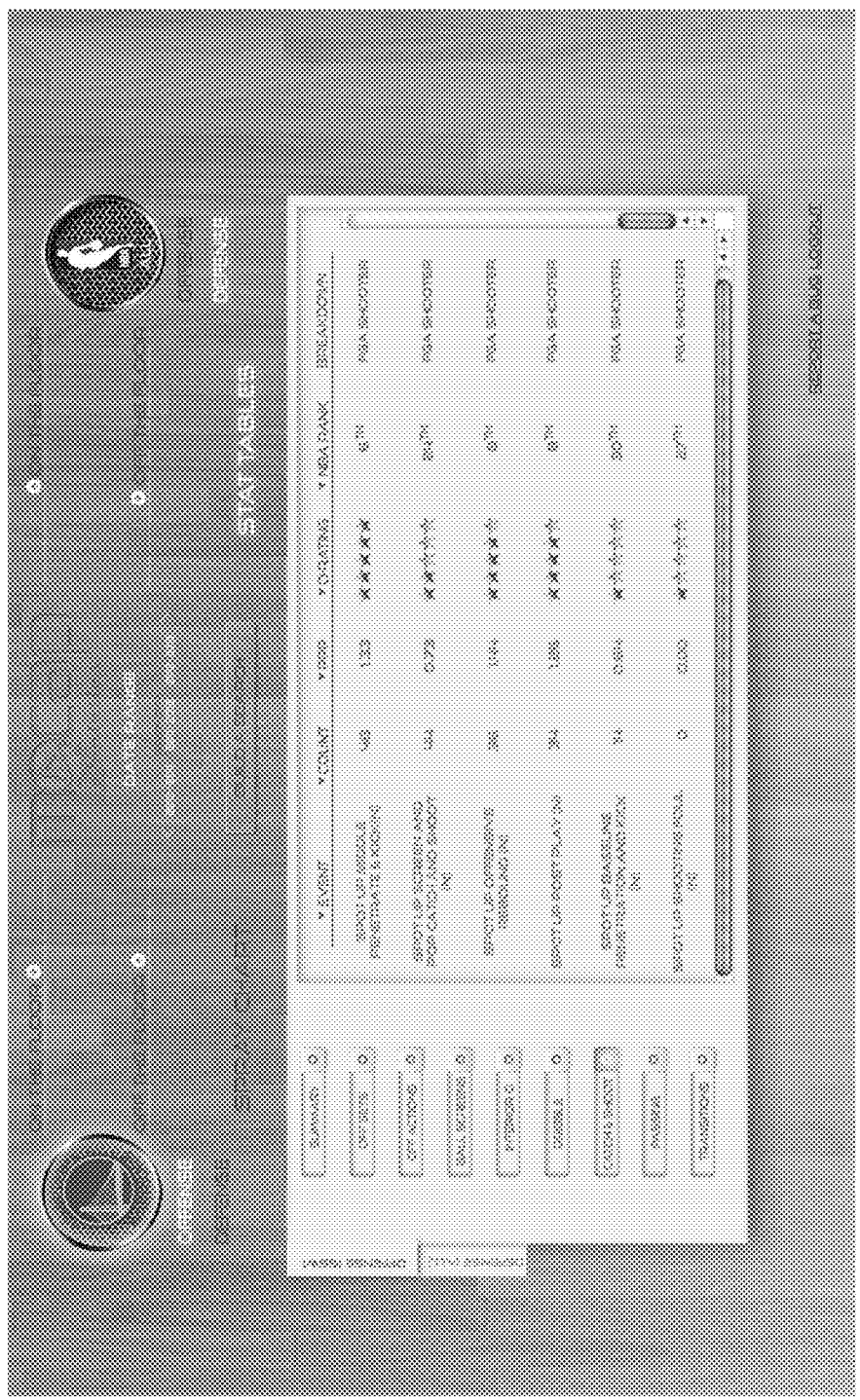
FIG. 18 is an illustration of a web application according to one embodiment of the invention.

FIG. 18. In a further embodiment of the technology, illustrated in FIG. 18 the output of the technology may be used in a web application to create, for example, "stat tables" which provide an overview of the rate and efficiency of various situations within each tab shown on the left. In the illustrated web application, the button "catch and shoot" is selected, and the various types of catch and shoot situations are shown in the table to the right. In one embodiment, links from this table are available to view the effectiveness of each player for a given category, or for each team for a given category. In one embodiment, a five star system may also be used to show the ranks within the table (in relation to all other events listed in the table).

Automated Narrative—Social Media

FIG. 19. In a further embodiment of the technology, the output of the present technology may be used to generate an automated narrative, such as, for example, the narrative illustrated in FIG. 19. In one embodiment of the present technology, the output may be used to generate an automated narrative during or after the processing of coordinate data. In one embodiment, a real time narrative can be made available through, for example, twitter or other social Media platforms. In one embodiment, all content, including "hashtags" are automatically generated from the coordinate data.

Automated Figure Generation

Figure 20A:
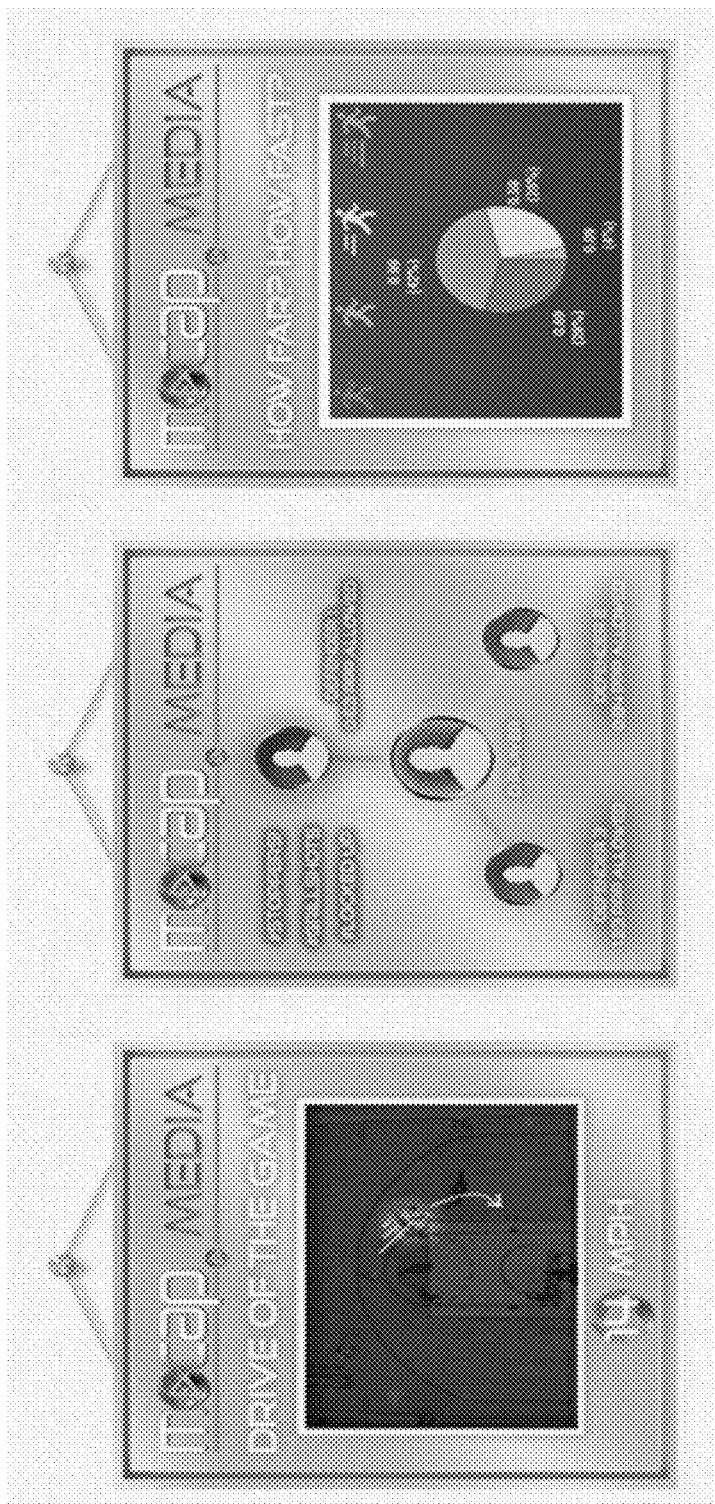
FIGS. 20a and 20b are illustrations of automated figures and content generated according to one embodiment of the invention.
Figure 20B:
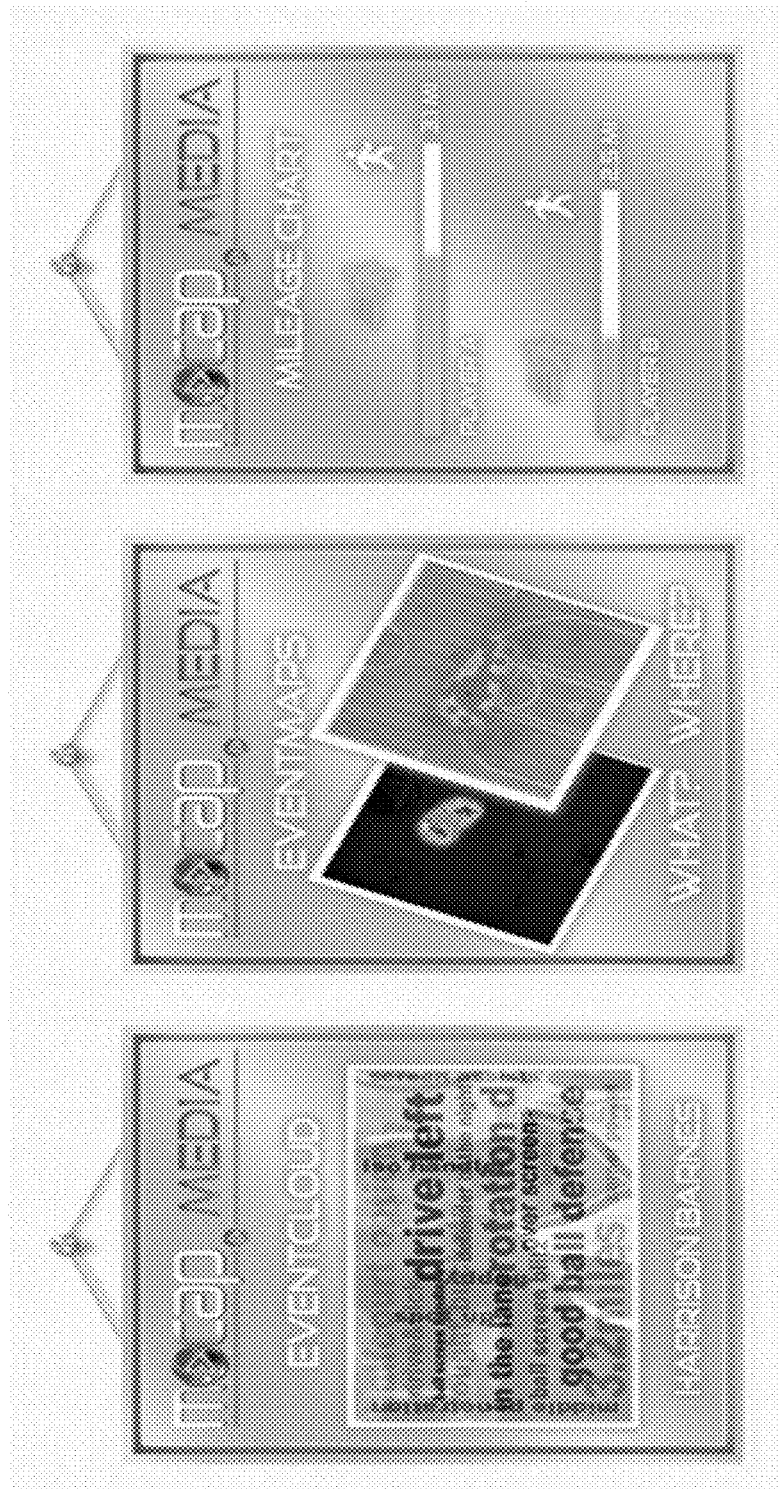

FIG. 20a and FIG. 20b. FIGS. 20a and 20b illustrate further embodiments of the technology wherein the output of the present technology may be used to generate figures automatically, such figures containing data and visuals created from our output files, or directly during processing of the coordinate data.

Automated Narrative

FIG. 21. In a further embodiment of the technology, the output of the present technology may be used to generate an automated narrative, such as, for example, the narrative illustrated in FIG. 21. In one embodiment of the present technology, the output may be used to generate an automated narrative during or after the processing of coordinate data. In one embodiment, a summary narrative can be made available through, for example, an email distribution. In one embodiment, all content, including "hashtags" are automatically generated from the coordinate data.

Graphical Overlay

Figure 22:
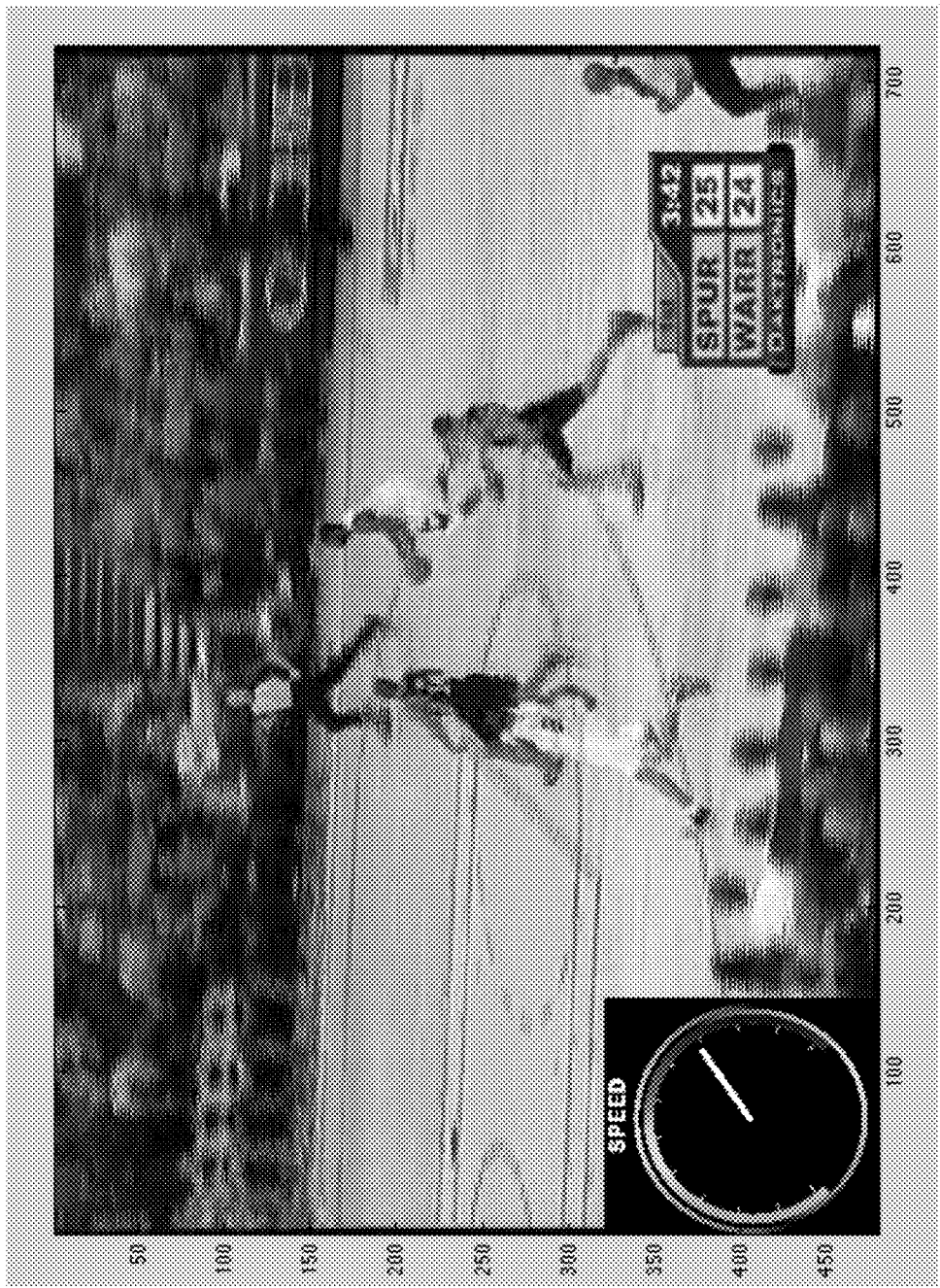
FIG. 22 is an illustration of a real-time overlay of event/activity profile data onto a video broadcast of the game.
Figure 27:
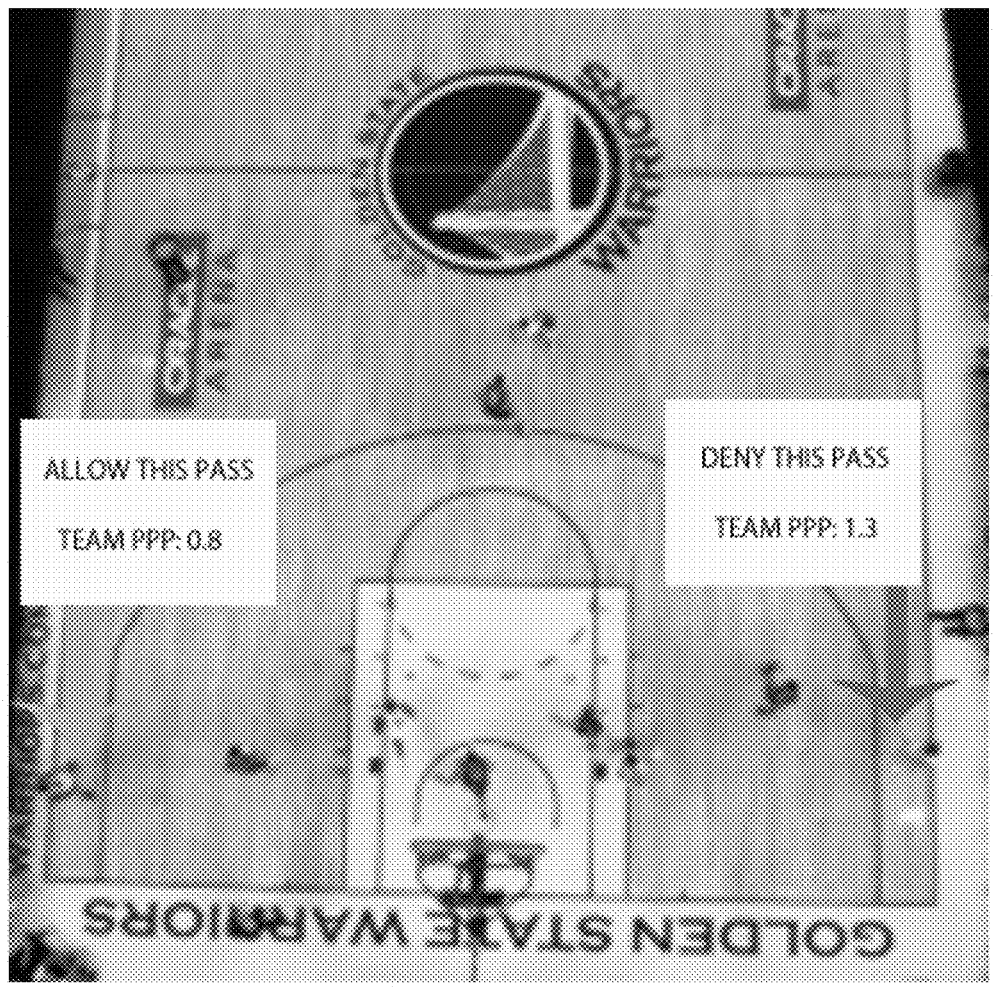
FIG. 27 depicts a visual system combining video broadcast and analytical and event profile data according to one embodiment of the invention.

FIG. 22 and FIG. 27. In a further embodiment of the technology, the output of the present technology may be used to generate a direct and automated overlay of additional information directly on the broadcast video. For example, as shown in FIG. 22, a graphical overlay measuring the speed of a player is depicted. This type of graphical overlay could be used to present any event profile data of interest to the broadcast audience. In another embodiment, as shown in FIG. 27, a visual system that may present the analysis of the combination of video and event/activity profile data by overlaying that data on the video.

Text Box Selection

Figure 23:
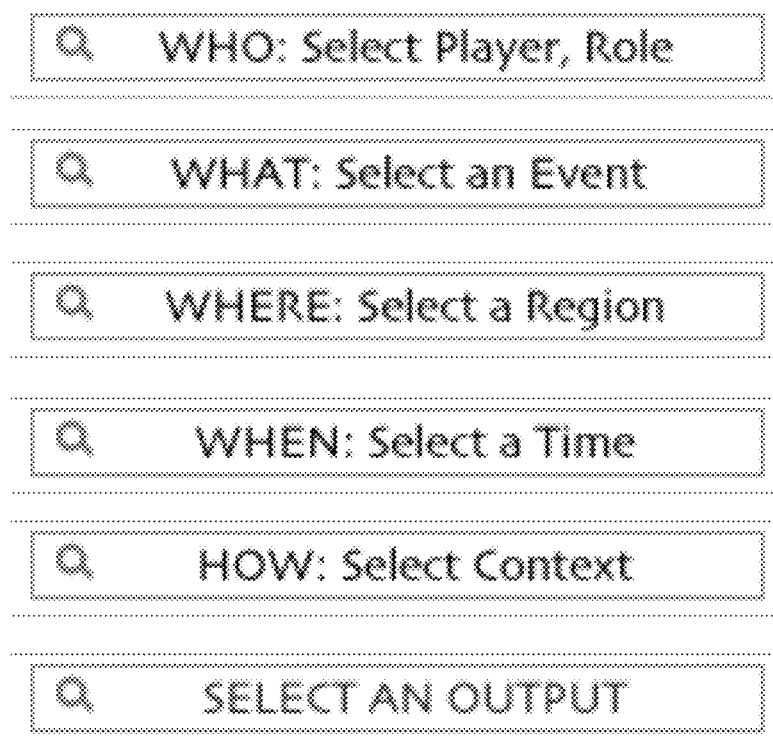
FIG. 23 is an illustration of a text box selection tool according to one embodiment of the invention.

FIG. 23. FIG. 23 is an illustration of a text box selection tool that allows the user to quickly and flexibly use text, or autofill input, to select who, what, where, when, how along with a type of output to answer a very granular question.

Suggestion Tools

Figure 24:
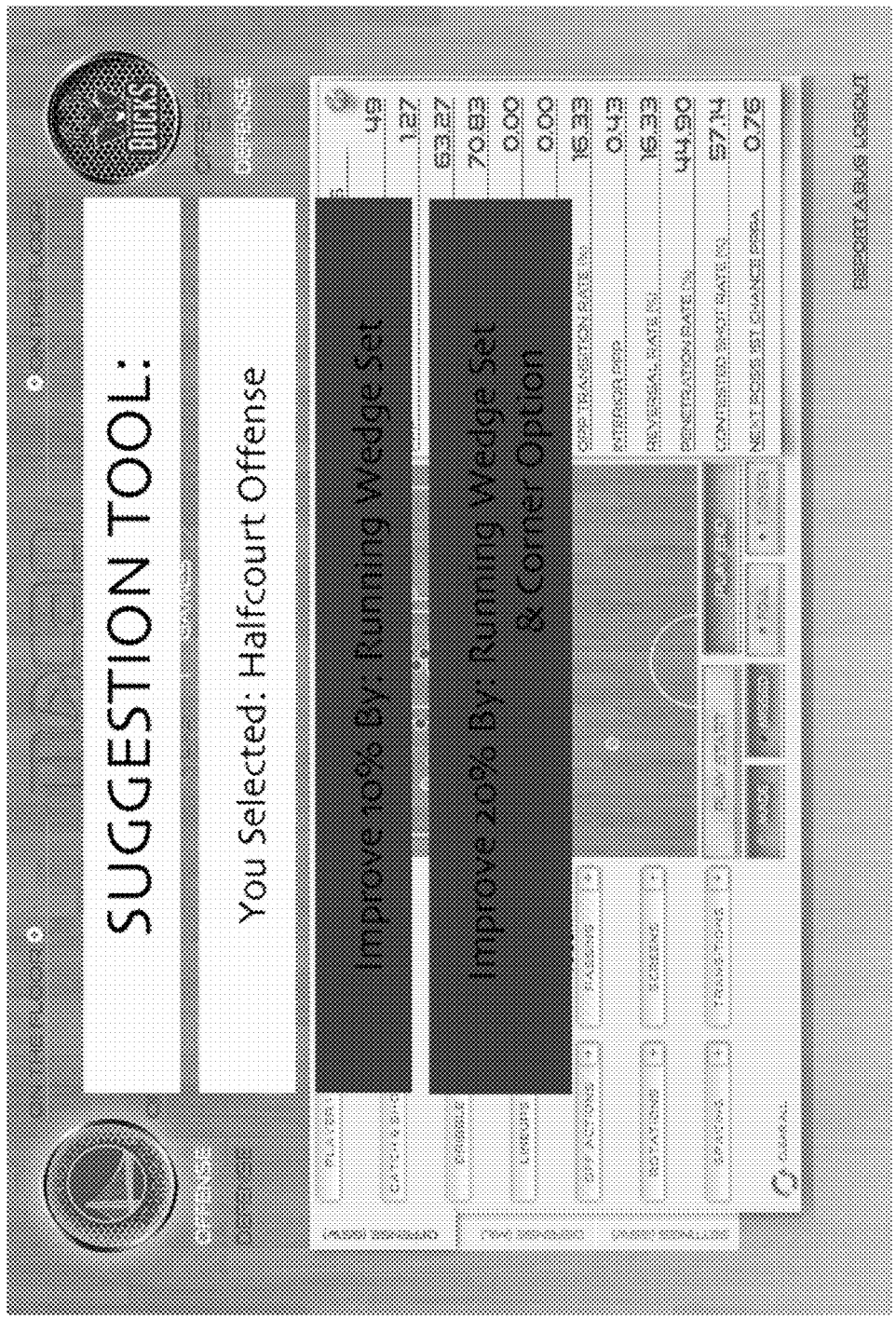
FIG. 24 is an illustration of a text box selection/suggestion tool according to one embodiment of the invention.

FIGS. 24, 25, 26a and 26b. FIG. 24 is an illustration of a selection and suggestion tool that processes a query based on a selected set of data filters and then provides the user with a single additional condition that will lead to the biggest expected improvement, or decline, in performance, for example, improve the halfcourt offense by running wedge set during the halfcourt offense. The user may also allow for suggestions based on multiple additional filters, such as running wedge set and using the corner option. FIG. 25 depicts a text selection suggestion tool which allows the user to enter input text indicating desired areas of improvement and returns a suggestion by examining those options.

FIGS. 26a and 26b depict a textual trend suggestion tool which highlights trends that are occurring in a given set of data and suggest improvements based upon user selections. For example, the suggestion tool might allow the user to input text, indicating the area that the user would like to improve, for example, offense, by adjusting selected categories, such as substitutions or plays, and the tool would make a suggestion using only those selected options. Alternatively, the tool would allow the user to view recent trends, then select a specific trend, and ask for a suggestion on how to reverse or continue that trend.

Additional and Illustrative Examples

The following provides examples of different aspects of the technology described in this specification. This material is provided for the sake of support and information and is not intended to be limiting in any way.

In one embodiment a system for enhanced sports analytics includes: i) an object tracking system for generating coordinate data corresponding to object motion in a sports event; ii) a data processing module for receiving the coordinate data from the object tracking system, analyzing the coordinate data with an event recognition algorithm for identifying and characterizing events and outcomes of interest, and cataloging the data in accordance with the identified events and outcomes into event profile data; iii) an output file database for receiving and storing the event profile data generated by the data processing module; and iv) a user application for accessing the event profile data from the output file database. In one embodiment the user application provides enhanced analytical information corresponding to sports and the user application is configured with an graphical interface to allow the user to specify parameters for the event recognition algorithm. In a further embodiment the coordinate data generated by the object tracking system includes spatial data, temporal data and/or object identifiers corresponding to object motion. In a further embodiment the object identified correspond to at least one of the ball, player, uniform number, position number, team name and referee. In a further embodiment the object tracking system generates coordinate data corresponding to motion of at least one of players, coaches, referees/officials, equipment, such as, for example, balls. In a further embodiment the data processing module includes an error analysis algorithm for identifying and overcoming errors in the received coordinate data. In a further embodiment the error analysis algorithm is configured to keep track of data resolution and/or measure data fidelity. In a further embodiment the user application is accessible via a computing device remotely via the Internet and/or locally via standalone software residing within a computing device. In a further embodiment the event recognition algorithm is configured to associate the coordinate data with predetermined events of interest. In a further embodiment the predetermined events of interest include at least one of offensive formations, defensive formations, scoring outcomes, non-scoring outcomes, play execution, player matchups, kinematic states of an object. In a further embodiment the data processing module obtains data corresponding to predetermined events of interest from a secondary data source. In a further embodiment the data processing module catalogs the coordinate data associated with the predetermined events of interest into event profile data. In a further embodiment the data processing module associates the event profile data with data from a secondary data source. In a further embodiment data from the secondary data source includes at least one of play-by-play data, video media, such as, for example video game footage, audio media, game states data, such as, for example, statistical information, object attributes, venue data, such as, for example, location, date/time of event, attendance, weather. In a further embodiment the data processing module is configured to receive data from a secondary data source and data from the secondary data source includes at least one of play-by-play data, video media, such as, for example, video game footage, audio media, game states data, such as, for example, statistical information, object attributes, venue data, such as, for example, location, date/time of event, attendance, weather. In a further embodiment the user application includes an interactive platform for generating customizable performance analytics. In a further embodiment the interactive platform is configured to generate customizable analytics on player performance. In a further embodiment the interactive platform is configured to generate customizable analytics on team performance. In a further embodiment the interactive platform is configured to generate customizable performance analytics which include strengths, weaknesses and tendencies. In a further embodiment the interactive platform is configured to allow a user to define value ranges for specific performance metrics. In a further embodiment the user application includes a diagnostic utility for automatically generating performance analytics. In a further embodiment the diagnostic utility is configured to automatically generate analytics involving predetermined performance metrics. In a further embodiment the diagnostic utility is configured to allow the user to automatically generate reports on strengths, weaknesses and/or tendencies corresponding to specific teams of players. In a further embodiment the user application includes a strategy utility for determining specific strategies to implement. In a further embodiment the strategy utility obtains performance analytics data on strengths, weaknesses and/or tendencies from the diagnostic utility and automatically generates strategies for implementation. In a further embodiment the user application includes a prediction utility for identifying desirable player or team characteristics in response to the performance analytics generated by the diagnostic utility. In a further embodiment the user application includes a scouting utility for identifying and/or assessing prospective player or team performance in response to the desirable player or team characteristics identified by the prediction utility. In a further embodiment the prediction utility is configured to recommend a particular player or team in corresponding to the identified desirable player or team characteristics. In a further embodiment the user application provides enhanced analytical information corresponding to at least one of offensive formations, defensive formations, scoring outcomes, play execution, player matchups, kinematic states of an object. In a further embodiment the user application provides enhanced analytical information corresponding to positioning of a player in possession of a ball. In a further embodiment the user application provides enhanced analytical information corresponding to positioning of a player not in possession of a ball. In a further embodiment the user application is configured to link to video media of the sports event associated with the event profile data.

In one embodiment an interactive software application for customized sports analytics includes: i) an output file for storing event profile data resulting from automated analysis of object coordinate data corresponding to a sporting event, the stored event profile data being cataloged according to descriptive tags; and ii) a user interface having multiple selectable fields corresponding to the cataloged descriptive tags in the output file. In a further embodiment the application is configured to generate customized sports analytics in response to user-specified queries made via the user interface. In a further embodiment the stored event profile data in the output file may be influenced by event detection algorithms applied to the object coordinate data. In a further embodiment the event detection algorithms applied to the object coordinate data include user-specified parameters. In a further embodiment the multiple selectable fields of the user interface includes pre-specified parameters. In a further embodiment the multiple selectable fields of the user interface include user-specified parameters. In a further embodiment the multiple selectable fields of the user interface include quantitative parameters. In a further embodiment the quantitative parameters of the multiple selectable fields are adjustable by the user. In a further embodiment the quantitative parameters of the multiple selectable fields are ranges of user provided values. In a further embodiment the user adjustable quantitative parameters of the multiple selectable fields are adjustable according to a sliding scale. In a further embodiment the multiple selectable fields of the user interface include a combination of parameters. In a further embodiment the multiple selectable fields of the user interface include qualitative parameters. In a further embodiment the qualitative parameters of the multiple selectable fields are defined by the user. In a further embodiment the application is configured to receive data from a secondary source. In a further embodiment the user interface is configured to filter data by fields associated with the secondary source data. In a further embodiment the customized sports analytics generated by the application includes at least one of numerical analytics, graphical analytics and video or audio media. In a further embodiment the customized sports analytics generated by the application includes a playlist of video media. In a further embodiment the customized sports analytics generated by the application are configured to be exported to additional applications. In a further embodiment the user interface is configured to be accessible via a computing device.

In one embodiment a sports analytics software includes: i) a data processing module for analyzing object coordinate data corresponding to a sports event and characterizing the object coordinate data into event profiles, the event profiles corresponding to events of interest; and ii) a data mining module for automated analysis of the event profiles to identify specific event profiles or combinations of event profiles that correlate with outcomes of interest. In a further embodiment the event profiles that correlate with outcomes of interest are associated with strengths, weaknesses and/or tendencies. In a further embodiment the event profiles associated with strengths, weaknesses and/or tendencies enable the evaluation of performance. In a further embodiment the event profiles associated with strengths, weaknesses and/or tendencies enable the evaluation of player performance. In a further embodiment the event profiles associated with strengths, weaknesses and/or tendencies enable the evaluation of team performance. In a further embodiment the event profiles associated with strengths, weaknesses and/or tendencies enable the evaluation of offensive performance. In a further embodiment the event profiles associated with strengths, weaknesses and/or tendencies enable the evaluation of defensive performance. In a further embodiment the data mining module identifies event profiles that correlate with predetermined outcomes of interest. In a further embodiment the data mining module recommends strategies responsive to the event profiles associated with strengths, weaknesses and/or tendencies. In a further embodiment the data mining module is configured to analyze user-identified event profiles. In a further embodiment the data processing module analyzes object coordinate data corresponding to a first sports event and the data mining module recommends strategies for a second sports event. In a further embodiment the first sports event precedes the second sports event. In a further embodiment the first sports event and the second sports event are the same event. In a further embodiment the data mining module is configured to provide the recommended strategies as a graphical overlay during a video broadcast of the sports event. In a further embodiment the data mining module identifies desirable matchups based on the event profiles associated with strengths, weaknesses and/or tendencies. In a further embodiment the data mining module identifies undesirable matchups based on the event profiles associated with strengths, weaknesses and/or tendencies. In a further embodiment the event profiles associated with strengths, weaknesses and/or tendencies are provided by the software to be a presented as a graphical overlay on video media corresponding to the sports event. In a further embodiment the graphical overlay is applied to a video replay of at least a portion of the sports event. In a further embodiment the graphical overlay of the video media is applied to a real time video broadcast of the sports event. In a further embodiment the graphical overlay of the video media is applied to a portion of a playing surface of the sports event. In a further embodiment the graphical overlay of the video media is applied to a portion of a basketball court. In a further embodiment the graphical overlay of the video media is applied to a portion of a football field. In a further embodiment the graphical overlay of the video media is applied to a portion of a baseball field. In a further embodiment the graphical overlay of the video media is applied to a player participating in the in the sports event. In a further embodiment the graphical overlay of the video media is configured to move with or alongside the player participating in the sports event. In a further embodiment the graphical overlay includes statistical information. In a further embodiment the graphical overlay includes qualitative information. In a further embodiment the sports analytics software includes an output file for storing event profiles and associated strengths, weaknesses and tendencies, wherein the output file is configured to supply data to video game and/or fantasy sports simulations.

In one embodiment a sporting event viewing application includes: i) a data processing module for analyzing object coordinate data corresponding to the sporting event and depositing the analyzed object coordinate data into an output file; and ii) a user application for accessing data from the output file and displaying dynamic game plots associated with data from the output file. In a further embodiment the dynamic game plots displayed by the user application include analytical information associated with the sporting event. In a further embodiment the dynamic game plots displayed by the user application includes spatial and temporal information associated with objects in the sporting event. In a further embodiment the dynamic game plots displayed by the user application include spatial and temporal information associated with player positioning in the sporting event. In a further embodiment the dynamic game plots displayed by the user application include spatial and temporal information associated with ball positioning in the sporting event. In a further embodiment the dynamic game plots displayed by the user application include quantitative analytical information associated with the sporting event. In a further embodiment the quantitative analytical information associated with the sporting event displayed by the user application includes player specific information. In a further embodiment the quantitative analytical information associated with the sporting event displayed by the user application includes kinematic information corresponding to an object within the sporting event. In a further embodiment the quantitative analytical information associated with the sporting event displayed by the user application includes kinematic information corresponding to a player within the sporting event. In a further embodiment the analytical information associated with the sporting event displayed by the user application includes event profile information from the sporting event. In a further embodiment the user application is configured to display the dynamic game plots during the sporting event. In a further embodiment the user application is configured to display the dynamic game plots following conclusion of the sporting event. In a further embodiment the user application is configured to display the dynamic game plots via the Internet. In a further embodiment the user application is configured to display the dynamic game plots via broadcast television. In a further embodiment the user application is configured to display the dynamic game plots via a mobile device. In a further embodiment the dynamic game plots displayed by the user application includes a virtual depiction of the sporting event. In a further embodiment the virtual depiction of the sporting event corresponds to a two-dimensional display. In a further embodiment the virtual depiction of the sporting event corresponds to a three-dimensional display. In a further embodiment the three-dimensional display corresponds to a holographic display.

In one embodiment a sports analytics utility includes: i) a data processing module for receiving object tracking coordinate data associated with a sports event; and video media corresponding to the sports event. In a further embodiment the data processing module a) utilizes event recognition techniques to identify and characterize events and outcomes of interest from the coordinate data as event profile data, b) applies image processing to the video media to extract data associated with the sports event, c) synchronizes the extracted sports event data from the video media with the event profile data, and catalogs the event profile data and synchronized video media; ii) an output file database for receiving and storing the cataloged event profile data and synchronized video media; iii) a user application for accessing the cataloged event profile data and synchronized video media from the output file database. In a further embodiment the user application enables the user to search for specific event profiles and associated video media. In a further embodiment the user application is configured to produce a playlist of video media clips corresponding to a user specified search. In a further embodiment the sports analytics utility, includes a display for user viewing of video media. In a further embodiment the sports analytics utility includes a program for overlaying event profile data on the displayed video media. In a further embodiment the program for overlaying event profile data on the displayed video media includes overlaying analytical player information on the displayed video media. In a further embodiment the user application is configured to enable the user to save the playlist of video media clips for future reference. In a further embodiment the user application is configured to enable the user to share the playlist of video media clips with other users. In a further embodiment the user application is configured to enable the user to share at least a portion of the playlist of video media clips with other users via a social media/networking utility. In a further embodiment the user application is configured to enable the user to insert comments corresponding to select video media clips on the playlist. In a further embodiment the user application is configured to provide a graphical display corresponding to a user specified search. In a further embodiment the graphical display includes event profile data. In a further embodiment the event profile data is linked to the associated video media.

In one embodiment a sports viewing utility includes: i) a data processing module for receiving object tracking coordinate data associated with a sports event and video media corresponding to the sports event; and ii) a user interface including a display for displaying the video media of the sports event and synchronized event profile data and multiple selectable fields corresponding to the event profile data. In a further embodiment the data processing module utilizes event recognition techniques to identify and characterize events and outcomes of interest from the coordinate data as event profile data, applies image processing to the video media to extract data associated with the sports event, and synchronizes the extracted sports event data from the video media with the event profile data. In a further embodiment the user interface enables the user to select the type and form of event profile data to be displayed alongside the video media. In a further embodiment the synchronized event profile data displayed by the user interface includes numeric statistical information. In a further embodiment the synchronized event profile data displayed by the user interface includes graphical statistical information. In a further embodiment the synchronized event profile data displayed by the user interface includes a graphical or textual overlay over the displayed video media. In a further embodiment the graphical or textual overlay over the displayed video media includes quantitative, qualitative, statistical, strategic and/or kinematic information.

In one embodiment an interactive graphical application for enhanced sports analytics includes: i) a data processing module for receiving object tracking coordinate data associated with a sports event; and ii) a user interface including a graphical display for presenting the event profile data and multiple selectable fields configured to enable user filtering of the event profile data. In a further embodiment the data processing module includes an event recognition algorithm to automatically identify and characterize events and outcomes of interest from the coordinate data as event profile data. In a further embodiment the event recognition algorithm of the data processing module can be customized based on user-specified parameters. In a further embodiment the event profile data presented on the graphical display is linked to numeric data. In a further embodiment the event profile data presented on the graphical display is linked to video media associated with the event profile data. In a further embodiment the user interface further includes a video display for playing video media associated with the event profile data. In a further embodiment the graphical display of the user interface includes a virtual basketball court and wherein the event profile data includes ball possessions associated with shots taken. In a further embodiment the event profile data includes ball possessions associated with shots made. In a further embodiment the event profile data includes ball possessions associated with shots missed. In a further embodiment the interactive graphical application for enhanced sports analytics includes a computing device. In a further embodiment the computing device includes a personal computer. In a further embodiment the computing device includes a mobile device. In a further embodiment the mobile device includes a tablet. In a further embodiment the mobile device includes an iPad.

In one embodiment a software application for enhanced viewing of a sporting event includes a data processing module for receiving object tracking coordinate data associated with the sporting event, applying an event recognition algorithm to automatically identify and characterize events and outcomes of interest from the object tracking coordinate data as event profile data, and comparing the event profile data associated with the sporting event with archived event profile data from previous sporting events. In a further embodiment wherein the software application generates enhanced analytics from the comparing the event profile data from the sporting event with the archived event profile data. In a further embodiment enhanced analytics generated by the software application include outcome probabilities. In a further embodiment outcome probabilities generated by the software application include team win/loss probabilities.

In a further embodiment outcome probabilities generated by the software application include player performance probabilities. In a further embodiment player performance probabilities generated by the software application include offensive performance probabilities. In a further embodiment the enhanced analytics generated by the software application facilitates placing bets on the sporting event. In a further embodiment the enhanced analytics generated by the software application are applicable to fantasy sports gaming. In a further embodiment the enhanced analytics generated by the software application are generated contemporaneously with the sporting event. In a further embodiment the enhanced analytics generated contemporaneously with the sporting event are configured to be displayed on a mobile device. In a further embodiment the sporting event are configured to be displayed as a graphical overlay during a video broadcast of the sporting event.

In one embodiment a software application for enhanced performance analytics includes a data processing module for receiving object tracking coordinate data associated with a sport program, applying an event recognition algorithm to automatically identify and characterize events and outcomes of interest from the object tracking coordinate data as event profile data, and comparing the event profile data associated with the sport program with archived event profile data from previous sport program. In a further embodiment the software application generates enhanced performance analytics from comparing the event profile data from the sporting event with the archived sports program event profile data. In a further embodiment the event profile data from the data processing module can be subdivided according to pre-specified and/or user-specified categories. In a further embodiment the event profile data from the data processing module includes player performance data. In a further embodiment the player performance data includes player kinematic data. In a further embodiment the player performance data includes data on player physical conditioning. In a further embodiment the event profile data from the data processing module includes referee performance data. In a further embodiment the enhanced performance analytics relates to the consistency of referee calls. In a further embodiment the enhanced performance analytics relates to referee positioning. In a further embodiment the enhanced performance analytics relating to referee positioning relates to referee positioning relative to the location of a game ball. In a further embodiment the enhanced performance analytics relating to referee positioning relates to referee positioning relative to other referees. In a further embodiment the enhanced performance analytics relating to referee positioning relates to referee positioning relative to specific players. In a further embodiment the enhanced performance analytics relating to referee positioning relates to referee positioning relative to the game playing surface. In a further embodiment the object tracking coordinate data received from a sports program includes coordinate data received from at least one of a game, practice and drill/demonstration.

In one embodiment a method of processing streaming data from a sporting event includes the steps of: i) collecting data from one or more sources of continuous stream data where such sources monitor the sporting event; ii) scanning the collected continuous stream data for errors and missing data segments; iii) correcting errors in the collected continuous stream data using error correction algorithms; iv) inserting data to fill in missing data in the collected data using one or more bridging algorithms; v) converting the collected continuous stream data to a mathematical description of the live event; vi) generating one or more subsets of the converted data, wherein the generated subsets are descriptive of one or more parameters or elements of the live event. In a further embodiment the generated subsets are stored in an output table. In a further embodiment the generated subsets are transmitted to a user. In a further embodiment the generated subsets are transmitted via a social media channel. In a further embodiment the generated subsets are transmitted via a media channel. In a further embodiment the generated subsets are transmitted via a television feed. In a further embodiment the generated subsets are superimposed on transmissions from a media channel. In a further embodiment the generated subsets are superimposed on a television feed. In a further embodiment the sources of continuous stream data are devices adapted to tracking movement of objects which for part of the sporting event. In a further embodiment the sources of continuous stream data are camera's arranged to capture the movement of objects in the sporting event. In a further embodiment the sources of continuous data are detectors arranged to receive signals from transmitters attached to objects in the sporting event. In a further embodiment the transmitters are RFID tags.

In one embodiment a method of converting a video feed from a sporting event into an output table containing information about specific situations in the sporting event includes the steps of: i) collecting data from the video feed; ii) converting the collected data into a data stream representing coordinate data for objects in the sporting event; iii) applying one or more predefined algorithms to the coordinate data, where in the predefined algorithm is selected from a library of predefined algorithms based upon criteria related to the game situation to be analyzed; iv) storing the output of the predefined algorithm in a user accessible output table. for a period of 100 days from the Effective Date the output of the predefined algorithm is transmitted to users via social media. In a further embodiment the social media used is Twitter. In a further embodiment the output of the predefined algorithm is combined with the original video feed. In a further embodiment the combined output is transmitted to users in real time. In a further embodiment the objects are selected from one or more of the following: balls, players or referees. In a further embodiment the algorithm is selected based upon the occurrence of specific events within the sporting event. In a further embodiment the selected algorithm processes input data representative of a time period wherein the specific event occurs. In a further embodiment the output of the selected algorithm is data representative of player movement during the selected even. In a further embodiment the data is pre-filtered prior to the application of the one or more algorithms to a subset of the data representing parameters specific to the specific events in the sporting event. In a further embodiment the filtered data is followed for the period of time necessary to describe the selected event. In a further embodiment the selected event is an offensive possession during a basketball game. In a further embodiment In one embodiment a method of creating output data for use by a user includes the steps of: i) receiving raw data representative of the real time position of objects; ii) filtering the raw data to identify missing data or errors in the data; iii) correcting the errors in the data and filling in data for the missing data; iv) filtering the corrected data through algorithms which reduce the total data in the data set by selectively outputting data which is relevant to pre-selected situations, times or other criteria which is related to the pre-selected situations; v) placing the filtered data into an output table which may be queried by users. In a further embodiment the filtered data is useable to generate customizable outputs. In a further embodiment the customizable outputs allow the user to remove specific objects from the output. In a further embodiment the output is uses to generate possession tails representative of specific actions related to the real time position of the objects. In a further embodiment the possession tails are representative of player position over a predefined period. In a further embodiment the possession tails are colored to represent predefined characteristics of a players movement during the predefined period. In a further embodiment the output may be used to generate one or more analytical tools. In a further embodiment the analytical tool illustrates player efficiency for particular situations. In a further embodiment the analytical tool provides recommendations for particular game situations. In a further embodiment the analytical tool outputs data to a tablet display. In a further embodiment the output is used to generate a comparative analysis tool. In a further embodiment the comparative analysis tool provides an output indicative of players comparative strengths and weaknesses. In a further embodiment the players comparative strengths and weaknesses are relative to particular game situations. In a further embodiment the player's comparative strengths and weaknesses are relative to other players in particular game situations. In a further embodiment the output is used to generate a similarity tool. In a further embodiment the output data is indicative of the similarities between selected players.

In one embodiment a method of distributing output data for use by a user includes the steps of: i) receiving raw data representative of the real time position of objects; ii) filtering the raw data to identify missing data or errors in the data; iii) correcting the errors in the data and filling in data for the missing data; iv) filtering the corrected data through algorithms which reduce the total data in the data set by selectively outputting data which is relevant to pre-selected situations, times or other criteria which is related to the pre-selected situations; v) placing the filtered data into an output table which may be queried by users; and vi) distributing the output data to users via social media. In a further embodiment the data is distributed by means of live tweets. In a further embodiment the data is distributed by means of a blog. In a further embodiment the blog is a continuous narrative of a specific game. In a further embodiment the data is distributed by means of an e-mail or a string of e-mails. In a further embodiment the e-mails are generated in response to the occurrence of predetermined events related to the raw data. In a further embodiment the data is distributed via a first screen which may be integrated into a second screen to enable the user to see the data in conjunction with real time events. In a further embodiment the second screen is video of a sporting event. In a further embodiment the first screen is a ticker generated using the distributed data.

In one embodiment a method of distributing output data for use by a user includes the steps of: i) receiving raw data representative of the real time position of objects; ii) filtering the raw data to identify missing data or errors in the data; iii) correcting the errors in the data and filling in data for the missing data; iv) filtering the corrected data through algorithms which reduce the total data in the data set by selectively outputting data which is relevant to pre-selected situations, times or other criteria which is related to the pre-selected situations; v) placing the filtered data into an output table which may be queried by users; and vi) distributing the output data to users via web applications. In a further embodiment the output data is filtered through user selected filters and displayed in a spray chart format. In a further embodiment the output data is displayed in a stat table. In a further embodiment the stat table provides an overview of the rate and efficiency of players in various game situations.

In one embodiment a method of distributing output data for use by a user includes the steps of: i) receiving raw data representative of the real time position of objects; ii) filtering the raw data to identify missing data or errors in the data; iii) correcting the errors in the data and filling in data for the missing data; iv) filtering the corrected data through algorithms which reduce the total data in the data set by selectively outputting data which is relevant to pre-selected situations, times or other criteria which is related to the pre-selected situations; v) placing the filtered data into an output table which may be queried by users; and vi) distributing the output data to users via automated transmissions. In a further embodiment the output is distributed via an automated narrative. In a further embodiment the automated narrative is generated concurrently with the processing of coordinate data. In a further embodiment the automated narrative is made available to the user through a social media channel. In a further embodiment the automated narrative is made available to the user through twitter. In a further embodiment hashtags are generated automatically. In a further embodiment all content is generated automatically. In a further embodiment the output is distributed via an automated figure generator. In a further embodiment the generated figures contain visuals containing the output data.

The above detailed descriptions of embodiments of the invention are not intended to be exhaustive or to limit the invention to the precise form disclosed above. Although specific embodiments of, and examples for, the invention are described above for illustrative purposes, various equivalent modifications are possible within the scope of the invention, as those skilled in the relevant art will recognize. For example, while steps are presented in a given order, alternative embodiments may perform steps in a different order. The various embodiments described herein can also be combined to provide further embodiments.

In general, the terms used in the following claims should not be construed to limit the invention to the specific embodiments disclosed in the specification, unless the above detailed description explicitly defines such terms. While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

Tables

TABLE 1

Examples of Activity/Event Recognition in Basketball

1. Player Matchups
2. Ball Possessor
3. Ball Defender
4. Shot Defender
5. Shot location
6. Help Defender
7. Passer
8. Dribble Penetration (middle penetration, baseline penetration, etc.)
9. Dribble Penetration Defender
10. Screens (high screen, side screen, etc.)

TABLE 1-continued

Examples of Activity/Event Recognition in Basketball

11. On-ball screen, Off-ball screen
12. Space created by screen setter
13. Number of screeners (single, double, etc.)
14. Screen and roll
15. Screen and pop
16. Split screen
17. Slip screen
18. High Screen Defense (defender goes over)
19. High Screen Defense (defender goes under)
20. High Screen Defense (defenders switch)
21. High Screen Defense (defender "shows")
22. High Screen Defense (defender plays "soft")
23. High Screen Defense (defenders trap ball handler)
24. Double Team
25. Good Close Out
26. Bad Close Out
27. Close out speed
28. Close out distance
29. Close out acceleration
30. Close out deceleration
31. Distance between defender at start of possession
32. Distance between defender at time of shot attempt
33. Post Play
34. Post Play start location and distance from hoop
35. Post Play end location and distance from hoop
36. Difference in post play start location and end location
37. Post defender
38. Post shoulder turn direction
39. Post play face up
40. Post play back down
41. High post play
42. Direction that defense forces the post play (i.e., middle or baseline, etc.)
43. Isolation
44. Transition
45. Time to front court
46. Back court ball handler
47. Back court pressure
48. Help Defense Type (i.e., "Gap Seal")
49. Cutter
50. Defender gets beat
51. Time between initial possession and shot attempt
52. Player velocities and accelerations
53. Number of speed bursts
54. Number of acceleration bursts
55. Fatigue
56. Effort compared to baseline metrics
57. Ability to Fight through pick
58. Court Spacing
59. Location of ball bounces following missed shots depending on shot location, player, etc. (most likely)
60. Identify play called and option used on play
61. Design new plays
62. Event Stops
63. Movement on Offense
64. Defensive and offensive rebound percentages following specific events
65. Opponent transition rates following specific events
66. Zone defense or man-to-man defense
67. Type of zone defense (i.e., 2-3, or 1-2-2, or box and one, etc.)
68. Shot Region (Right wing, high post, left corner, etc.)
69. Catch Region (Right wing, high post, left corner, etc.)
70. Contested or Uncontested catch
71. Contested or Uncontested shot
72. Contested or Uncontested rebound
73. Ball reversal

TABLE 2

Examples of Activity/Event Recognition in Football

1. Path to ball
2. Defensive player reaction to run/pass
3. Force of hit
4. Speed moving left or right TABLE 2-continued Examples of Activity/Event Recognition in Football 5. Type of passes caught on a defender (passes in front of defender, deep balls, etc)
6. Success of play type against a defensive set
7. Pocket mobility
8. Effort
9. Missed tackles

TABLE 3

Examples of Activity/Event Recognition in Baseball

1. Normalize defensive ability by difficulty of play
2. Lead distance for baserunner - risk v reward
3. Catcher - time from home to $2^{nd}$
4. Catcher ability to throw to $2^{nd}$ based on pitch
5. Strike zone for ump (triangular pyramid vs. rectangular prism)
6. Required average velocity for perfect path to ball
7. Ball velocity prior to catch
8. Projected ball velocity prior to catch (horizontal and vertical projections)
9. Identification of candidate fielders that had opportunities to field balls
10. Description of fielding opportunity difficulty
11. Description of fielding opportunity result
12. Ball paths as a function of situational events (e.g., batter A, when batting right-handed and facing a right-handed pitcher that throws fast balls between 90-93 mph and has no teammates on base, historically hits balls with the described ball paths)
13. Quantitative metrics to consistently define plays that should be considered errors (for example, a ball hit to the outfield that requires a perfect average velocity of 5 ft/s and is not caught should be considered an error)
14. Automated line-up optimization
15. Automated expected success rates of managerial decisions - hit & run with 1 out and runner on $1^{st}$ in $9^{th}$ inning of a 0-0 game against a pitcher who hasn't given up a run through 8⅓ innings?

TABLE 4

Example Categories of Searchable Criteria

| | |
|---|---|
| (1) | Players on/off court (or field of play) |
| (2) | Possession by specified team |
| (3) | Events of interest |
| (4) | Events involving specified players |
| (5) | Games states (game, time, score differential, etc) |
| (6) | Filters work on "and/or" basis for game state ID |
| (7) | Filter based on outcomes (points, activities, etc) |
| (8) | Player matchups (Player A guarding Player B) |
| (9) | Filter based on expected outcomes (points, activities, etc) |

What is claimed is:

1. An apparatus, comprising:
a camera-based system specially adapted to track at least one object during a sporting activity, wherein the camera-based system comprises:
at least one camera, wherein the at least one camera is specially adapted to record video information regarding the at least one object during the sporting activity, and generate video signals corresponding to the at least one object, and
at least one processor that analyzes the video signals to generate digital positioning data corresponding to the at least one object, and generates a data stream comprising the video signals and the digital positioning data; and
a synthesizer unit that is adapted to receive the data stream generated by the at least one processor and perform further processing on the data stream to recognize one or more spatial and temporal patterns of the at least one object in regard to the sporting activity, analyze the one or more spatial and temporal patterns to determine one or more sporting activity events of the sporting activity within context of the sporting activity and one or more event characterizations that provide meaning to the one or more sporting activity events within context of the sporting activity, and generate a profile dataset of the sporting activity and the one or more sporting activity events ("event/activity profile dataset") based on the one or more sporting activity events and the one or more event characterizations.

2. The apparatus of claim 1, wherein the synthesizer unit is specially programmed to perform at least one of:
(1) a processing routine for error analysis and resolution in connection with the data stream; and
(2) a processing routine for identifying the sporting activity based on the one or more spatial and temporal patterns.

3. The apparatus of claim 1, wherein the one or more event characterizations include a player-related characterization and a team-related characterization.

4. The apparatus of claim 1, wherein the synthesizer unit analyzes the event/activity profile dataset to determine one or more activity characterizations associated with the sporting activity.

5. The apparatus of claim 1, wherein the synthesizer unit determines one or more outcome probabilities based on the one or more sporting activity events.

6. The apparatus of claim 1, wherein the synthesizer unit receives a desired outcome and determines one or more recommended sporting activity events likely to lead to the desired outcome.

7. The apparatus of claim 1, wherein the one or more event characterizations include game states data including a game-related parameter, a team-related parameter, and a player-related parameter, wherein the one or more sporting activity events are determined based on one or more of the game-related parameter, the team-related parameter, or the player-related parameter, and wherein the profile dataset is generated based on the one or more of the game-related parameter, the team-related parameter, or the player-related parameter.

8. An apparatus, comprising:
a camera-based system specially adapted to track at least one object during a sporting activity, wherein the camera-based system comprises:
at least one camera, wherein the at least one camera is specially adapted to record video information regarding the at least one object during the sporting activity, and generate video signals corresponding to the at least one object, and
at least one processor that analyzes the video signals to generate digital positioning data corresponding to the at least one object, and generates a data stream comprising the video signals and the digital positioning data;
a synthesizer unit that is adapted to receive the data stream generated by the at least one processor and perform further processing on the data stream to recognize one or more spatial and temporal patterns of the at least one object in regard to the sporting activity, analyze the one or more spatial and temporal patterns to determine one or more sporting activity events of the sporting activity within context of the sporting activity and one or more event characterizations that provide meaning to the one or more sporting activity events within context of the sporting activity, and generate a profile dataset of the sporting activity and the one or more sporting activity events ("event/activity profile dataset") based on the one or more sporting activity events and the one or more event characterizations; and a user device specially adapted to receive and display video of the sporting activity ("sporting activity video"), and further wherein the user device is specially adapted to receive information contained in the event/activity profile dataset for the sporting activity, and further wherein the user device is specially adapted to display information contained in the event/activity profile dataset for the sporting activity as an overlay over the sporting activity video.

9. The apparatus of claim 8, wherein the user device comprises a mobile device or a computer.

10. The apparatus of claim 8, wherein the event/activity profile dataset comprises at least one of: (1) sporting event identification; (2) sporting event description; (3) sporting event time; (4) sporting event outcome; (5) game states; (6) player identification; (7) referee identification; (8) player statistics; (9) ball position; and (10) outcome of historically similar situations.

11. The apparatus of claim 8, wherein the at least one camera comprises a plurality of cameras.

12. The apparatus of claim 8, wherein the at least one object comprises at least one of sporting equipment, a player, a referee and a ball.

13. The apparatus of claim 8, wherein the synthesizer unit is specially programmed to further perform at least one of:
  (1) a processing routine for error analysis and resolution in connection with the data stream; and
  (2) a processing routine for identifying the sporting activity based on the one or more spatial and temporal patterns.

14. A system, comprising:
a sports activity venue;
a camera-based system specially adapted and positioned in the sports activity venue to track at least one object during a sporting activity in the sports activity venue, wherein the camera-based system comprises:
  at least one camera, wherein the at least one camera is specially adapted to record video information regarding the at least one object during the sporting activity, and generate video signals corresponding to the at least one object, and
  at least one processor that analyzes the video signals to generate digital positioning data corresponding to the at least one object, and generates a data stream comprising the video signals and the digital positioning data; and
a synthesizer unit that is adapted to receive the data stream generated by the at least one processor and perform further processing on the data stream to recognize one or more spatial and temporal patterns of the at least one object in regard to the sporting activity, analyze the one or more spatial and temporal patterns to determine one or more sporting activity events of the sporting activity within context of the sporting activity and one or more event characterizations that provide meaning to the one or more sporting activity events within context of the sporting activity, and generate a profile dataset of the sporting activity and the one or more sporting activity events ("event/activity profile dataset") based on the one or more sporting activity events and the one or more event characterizations.

15. The system of claim 14, wherein the event/activity profile dataset comprises at least one of: (1) sporting event identification; (2) sporting event description; (3) sporting event time; (4) sporting event outcome; (5) game states; (6) player identification; (7) referee identification; (8) player statistics; (9) ball position; and (10) outcome of historically similar situations.

16. The system of claim 14, wherein the at least one camera comprises a plurality of cameras.

17. The system of claim 14, wherein the at least one object comprises at least one of sporting equipment, a player, a referee and a ball.

18. The system of claim 14, wherein the synthesizer unit is specially programmed to further perform at least one of:
  (1) a processing routine for error analysis and resolution in connection with the data stream; and
  (2) a processing routine for identifying the sporting activity based on the one or more spatial and temporal patterns.

19. The system of claim 14, wherein the sports activity venue comprises one of a stadium, an arena, a park and a gym.

20. The system of claim 14, further comprising a user device specially adapted to receive and display video of the sporting activity ("sporting activity video"), and further wherein the user device is specially adapted to receive information contained in the event/activity profile dataset, and further wherein the user device is specially adapted to display information contained in the event/activity profile dataset as an overlay over the sporting activity video.

21. The system of claim 20, wherein the event/activity profile dataset comprises at least one of: (1) sporting event identification; (2) sporting event description; (3) sporting event time; (4) sporting event outcome; (5) game statistics; (6) player identification; (7) referee identification; (8) player statistics; (9) ball position; and (10) outcome of historically similar situations.

* * * * *